(12) United States Patent
Daigle

(10) Patent No.: US 8,849,246 B2
(45) Date of Patent: Sep. 30, 2014

(54) OPERATION OF A COMPUTING DEVICE INVOLVING WIRELESS TOKENS

(75) Inventor: Mark R. Daigle, Minnetonka, MN (US)

(73) Assignee: WherePro, LLC, Minnetonka, MN (US)

( * ) Notice: Subject to any disclaimer, the term of this patent is extended or adjusted under 35 U.S.C. 154(b) by 0 days.

(21) Appl. No.: 13/219,307

(22) Filed: Aug. 26, 2011

(65) Prior Publication Data

US 2012/0214443 A1    Aug. 23, 2012

Related U.S. Application Data

(60) Provisional application No. 61/377,724, filed on Aug. 27, 2010, provisional application No. 61/385,369, filed on Sep. 22, 2010, provisional application No. 61/393,758, filed on Oct. 15, 2010, provisional application No. 61/405,345, filed on Oct. 21, 2010, provisional application No. 61/451,099, filed on Mar. 9, 2011, provisional application No. 61/454,021, filed on Mar. 18, 2011, provisional application No. 61/524,401, filed on Aug. 17, 2011.

(51) Int. Cl.

| H04M 1/66 | (2006.01) |
|---|---|
| H04M 1/68 | (2006.01) |
| H04M 3/16 | (2006.01) |
| H04W 48/08 | (2009.01) |
| H04L 9/32 | (2006.01) |
| H04W 12/04 | (2009.01) |

(52) U.S. Cl.
CPC ............ *H04W 48/08* (2013.01); *H04L 9/3228* (2013.01); *H04W 12/04* (2013.01)
USPC ........................................................ 455/411

(58) Field of Classification Search
USPC ................................................ 455/411, 414.1
See application file for complete search history.

(56) References Cited

U.S. PATENT DOCUMENTS

| 6,865,161 | B1 |  | 3/2005 | Sponaugle et al. |
|---|---|---|---|---|
| 8,140,012 | B1 | * | 3/2012 | Causey et al. ................ 455/41.2 |
| 8,166,296 | B2 | * | 4/2012 | Buer et al. .................... 713/168 |
| 8,351,408 | B2 |  | 1/2013 | Daigle |
| 8,395,651 | B2 | * | 3/2013 | DeGrazia et al. .......... 348/14.02 |
| 2003/0037108 | A1 | * | 2/2003 | Peiffer et al. ................. 709/203 |
| 2005/0033656 | A1 | * | 2/2005 | Wang et al. ..................... 705/26 |
| 2005/0058112 | A1 | * | 3/2005 | Lahey et al. .................. 370/338 |
| 2006/0200671 | A1 |  | 9/2006 | Ishigaki et al. |
| 2007/0069901 | A1 | * | 3/2007 | Tuck et al. ................. 340/573.1 |
| 2007/0242643 | A1 | * | 10/2007 | Chandra et al. .............. 370/338 |

(Continued)

OTHER PUBLICATIONS

International Search Report and Written Opinion mailed Apr. 10, 2012.

(Continued)

*Primary Examiner* — Nathan Mitchell
(74) *Attorney, Agent, or Firm* — Merchant & Gould P.C.

(57) ABSTRACT

Tokens can be sent from a token generator using wireless radio frequency signals, such as in the form of a network name. A computing device operates in a first mode when receiving the tokens and in a second mode when not receiving the tokens. Also, the network name can include a URL, a part of a URL, or data usable to obtain a URL. A computing device can utilize the URL to obtain content from a data communication network. The computing device can display a link to the content, which may include a graphical icon associated with the content.

28 Claims, 22 Drawing Sheets

(56) References Cited

U.S. PATENT DOCUMENTS

| | | |
|---|---|---|
| 2009/0117883 A1* | 5/2009 | Coffing et al. ............. 455/414.1 |
| 2009/0222900 A1 | 9/2009 | Benaloh et al. |
| 2010/0046553 A1 | 2/2010 | Daigle |
| 2010/0120450 A1* | 5/2010 | Herz ......................... 455/456.3 |
| 2011/0047603 A1* | 2/2011 | Gordon et al. .................... 726/5 |
| 2011/0178862 A1 | 7/2011 | Daigle |
| 2012/0033591 A1 | 2/2012 | Daigle |
| 2013/0080590 A1* | 3/2013 | Bockus et al. ................ 709/219 |

OTHER PUBLICATIONS

Daigle, Mark R., U.S. Appl. No. 61/307,710, "Data Packet Generator and Implementations of Same," 135 pages.

* cited by examiner

362

DOMAIN REGISTRATION

| USER NAME: | ABC 123 |
| PASSWORD: | ABC 123 |

| FIRST NAME: | ANDREW |
| LAST NAME: | ALAN |

| BUSINESS NAME: | ABC CORP |
| BUSINESS ADDRESS: | 123 ABC ST... |
| DOMAIN TO BE REGISTERED: | www.example.com — 363 |

| GRAPHICAL ELEMENT: | c:\image.jpg | BROWSE |

☐ I AM AUTHORIZED TO ACT ON BEHALF OF THE DOMAIN OWNER

☒ I AM THE DOMAIN OWNER

| PAYMENT: | VISA 555 555 555 |

[ REGISTER ] — 364

FIG. 14

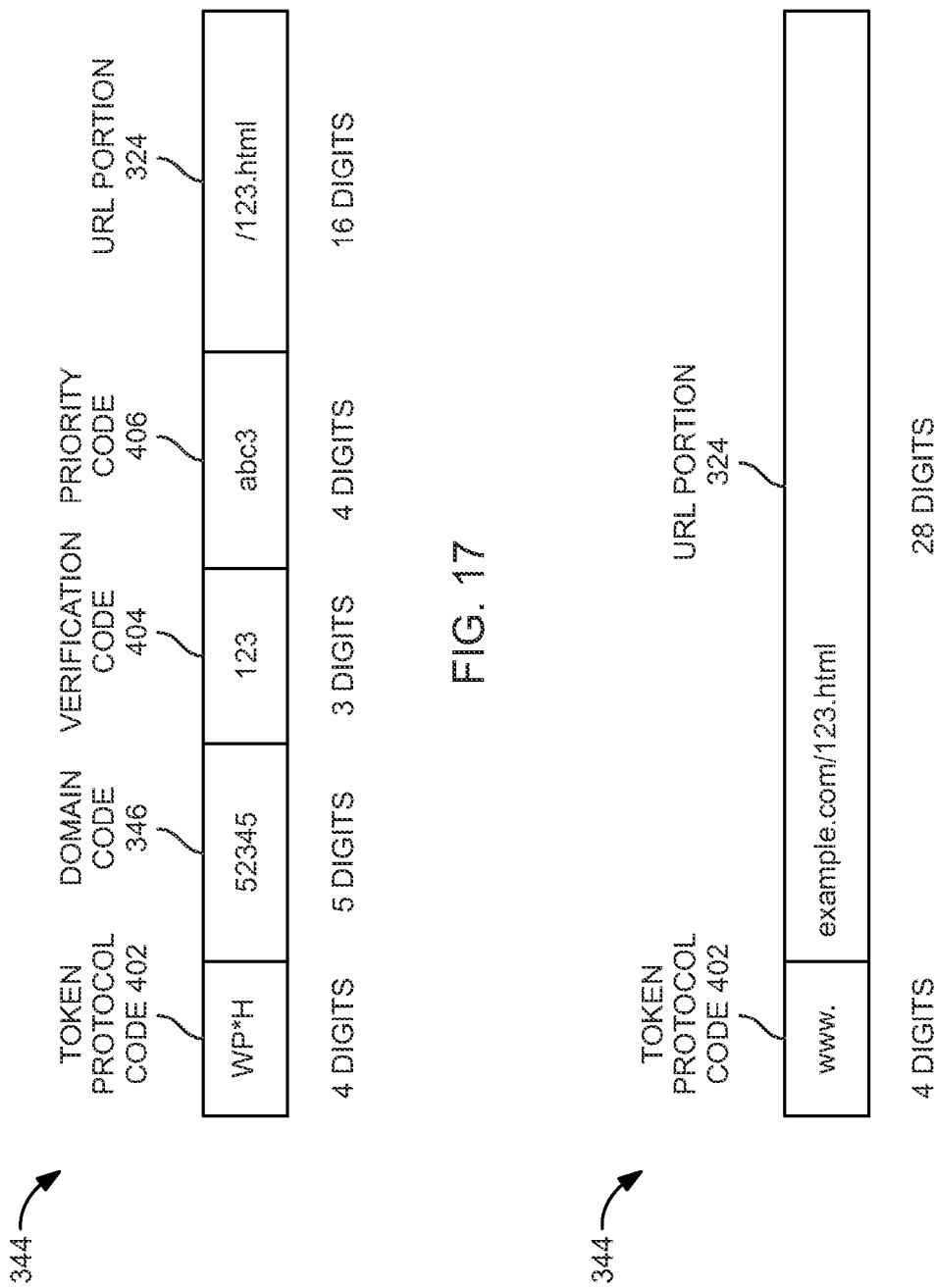

490

TOKEN PROTOCOL REGISTRATION

PROTOCOL NAME: AUTO DEALER
TOTAL DIGITS AVAILABLE: 32 ▽

DIGITS 1 ▽ TO 4 ▽
    DATA TYPE = PROTOCOL CODE
DIGITS 5 ▽ TO 10 ▽
    DATA TYPE = DOMAIN CODE
DIGITS 11 ▽ TO 32 ▽
    DATA TYPE = VIN NUMBER

⊞ ADD MORE
TOKEN PROTOCOL CODE: AD*1   CHECK AVAILABILITY
☑ AVAILABLE

REGISTER

FIG. 23

OPERATION OF A COMPUTING DEVICE INVOLVING WIRELESS TOKENS

CROSS-REFERENCE TO RELATED APPLICATIONS

This application claims priority to U.S. Provisional Application Ser. No. 61/377,724 filed on Aug. 27, 2010, entitled OPERATION OF A COMPUTING DEVICE INVOLVING WIRELESS SECURITY TOKENS; and to U.S. Provisional Application Ser. No. 61/385,369 filed on Sep. 22, 2010, entitled OPERATION OF A COMPUTING DEVICE INVOLVING WIRELESS SECURITY TOKENS; and to U.S. Provisional Application Ser. No. 61/393,758 filed on Oct. 15, 2010, entitled OPERATION OF A COMPUTING DEVICE INVOLVING WIRELESS SECURITY TOKENS; and to U.S. Provisional Application Ser. No. 61/405,345 filed on Oct. 21, 2010, entitled OPERATION OF A COMPUTING DEVICE INVOLVING WIRELESS SECURITY TOKENS; and to U.S. Provisional Application Ser. No. 61/451,099 filed on Mar. 9, 2011, entitled OPERATION OF A COMPUTING DEVICE INVOLVING WIRELESS SECURITY TOKENS; and to U.S. Provisional Application Ser. No. 61/454,021 filed on Mar. 18, 2011, entitled OPERATION OF A COMPUTING DEVICE INVOLVING WIRELESS SECURITY TOKENS; and to U.S. Provisional Application Ser. No. 61/524,401 filed on Aug. 17, 2011, the disclosures of which are incorporated by reference herein in their entireties.

BACKGROUND

Private transmission of wireless security tokens requires a sync or pairing between devices (e.g., Bluetooth®, Near Field Communications, etc.) so that token information remains confidential. Syncing or pairing between devices enables the devices to connect, but connecting to the wrong source can make the device vulnerable to hacking or other destructive activity. In many cases, public transmission of wireless security tokens (allowing the wireless security tokens to be publicly obtained within the broadcast range) would sufficiently achieve the desired result while avoiding a bridge being created between devices. Therefore, public transmission of wireless security tokens should be chosen whenever public broadcasts will not compromise the objective.

A system and method for publicly transmitting wireless security tokens is described, for example, in U.S. Ser. No. 12/554,798, titled DATA PACKET GENERATOR FOR GENERATING PASSCODES, the disclosure of which is incorporated by reference herein it its entirety. Further information can be found in U.S. Ser. No. 12/898,928, titled LOCATION BASED CONSUMER INTERFACE FOR RETAIL ENVIRONMENT, the disclosure of which is incorporated by reference herein in its entirety.

SUMMARY

The present disclosure relates generally to operation of a computing device involving wireless tokens. In one configuration, and by non-limiting example, the wireless token is transmitted using radio frequency signals, such as Wi-Fi, according to one of the IEEE 802.11 family of protocols. Other embodiments utilize other forms of communication of such tokens.

One aspect is a token generator comprising: a processor device; and a wireless communication device operably connected to the processor device and configured to wirelessly transmit a token using radio frequency signals according to a radio frequency data communication protocol, wherein the token is transmitted by the wireless communication device as a network name according to the data communication protocol, and the token includes at least a portion of a uniform resource locator.

Another aspect is a method of operating a token generator, the method comprising: wirelessly transmitting a token with the token generator, the token generator including at least a processing device and a wireless communication device, wherein the token is transmitted with radio frequency signals according to a radio frequency data communication protocol as a network name, the token including at least a portion of a uniform resource locator.

A further aspect is a mobile computing device comprising: a processor device; a wireless communication device operably connected to the processor device to wirelessly receive a token encoded in a radio frequency signal, the token including at least part of a uniform resource locator; and a cellular communication device operably connected to the processor device to wirelessly request data through a data communication network using the at least part of the uniform resource locator.

Yet another aspect is a method of operating a mobile computing device, the method comprising: wirelessly receiving a token from a radio frequency signal using a wireless communication device, the token including at least a part of a uniform resource locator; and sending a request to a web server with a cellular communication device using at least the part of the uniform resource locator.

A further aspect is a system comprising: a token generator operable to wirelessly transmit security tokens periodically; and a mobile computing device operable to receive the security tokens from the token generator, wherein the mobile computing device operates in a first mode when the security tokens are periodically received, and in a second mode when the security tokens are not periodically received.

Another aspect is a method of operating a mobile computing device, the method comprising: monitoring for and receiving a security token if available; operating the mobile computing device in a first mode if the security token is received; and operating the mobile computing device in a second mode if the security token is not received.

BRIEF DESCRIPTION OF THE DRAWINGS

FIG. 14 is a screen shot of an example user interface illustrating an example domain registration process for registering a domain with a token server.

FIG. 17 is a block diagram illustrating an example token according to a first token protocol.

FIG. 18 is a block diagram illustrating another example token according to a second token protocol.

FIG. 23 is a screen shot of an example user interface of a token registration process, such as provided by the token protocol server shown in FIG. 22.

DETAILED DESCRIPTION

Figure 1:
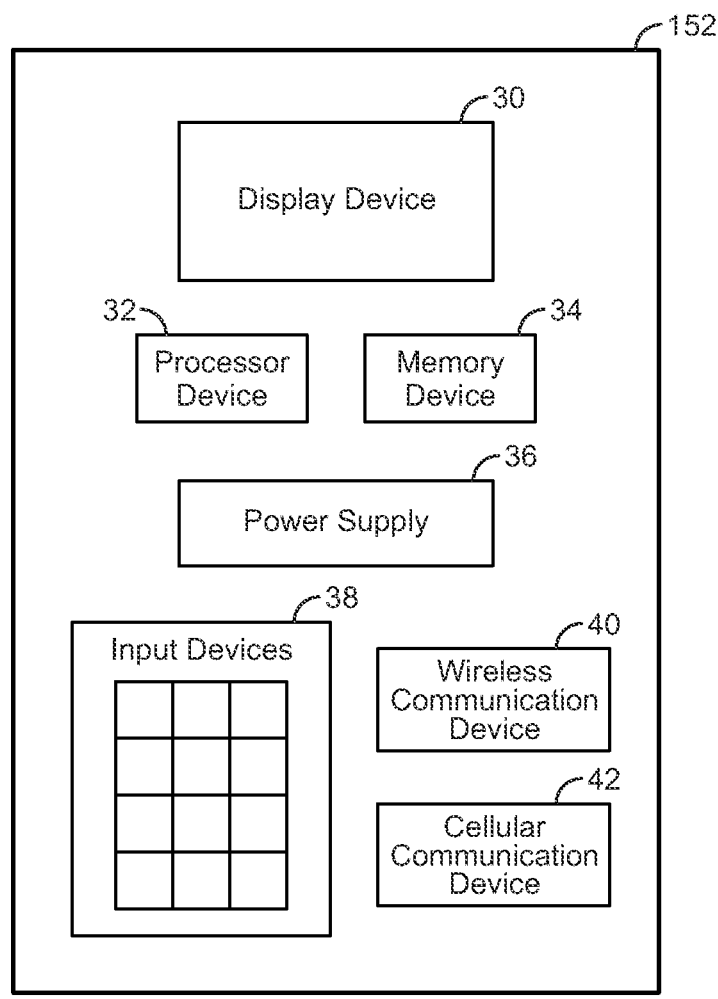
FIG. 1 is a schematic block diagram of a mobile computing device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

One example scenario in which public transmission of wireless security tokens can be beneficial occurs when a computing device assigned to a corporate employee is misplaced, but the computing device has access to the corporate information technology (IT) resources. When this occurs, corporate employees are sometimes hesitant to contact the IT help desk to report the computing device (such as illustrated in FIG. 1) as missing. Instead, the employees may prefer to wait and see if the missing device will turn up, rather than to notify the IT help desk immediately. Some employees rationally or irrationally fear retribution if it is discovered that they lost, or potentially lost, a computing device, for example. This creates a hesitancy to report missing devices, which in turn compromises end point security for the period of time between when the device goes missing and when the IT help desk takes action to secure the device. The public transmission of wireless security tokens can be used, however, to adjust the operation of the computing device when it has been misplaced, so that the security risk is reduced. This is only one of the many possible uses of wireless security tokens, and additional systems and methods involving the use of such tokens are described herein.

Examples of computing devices include mobile computing devices and non-mobile computing devices. An example of a non-mobile computing device is a personal computer. Examples of mobile computing devices include a laptop computer, a tablet computer, a smartphone, a personal digital assistant, a cellular phone, and the like.

FIG. 1 illustrates an example of a computing device, such as a mobile computing device 152. The mobile computing device 152 typically includes at least a processor device 32 and one or more wireless communication devices 40. Some embodiments further include one or more of: a display device 30, a memory device (such as one or more computer readable storage devices) 34, a power supply 36, and one or more input devices 38. The wireless communication device 40 can include a cellular communication device, or the mobile computing device can include a second wireless computing device in the form of cellular communication device 42. Computing devices typically include one or more housings.

Public transmission of wireless security tokens through web-enabled RFID can sufficiently solve this or other problems. Web-enabled RFID is described, for example, in U.S. Ser. No. 61/307,710 titled DATA PACKET GENERATOR AND IMPLEMENTATIONS OF SAME, the disclosure of which is hereby incorporated by reference in its entirety.

An example of the memory devices described herein is a computer readable storage media. Examples of computer readable storage media include magnetic cassettes, flash memory cards, digital video disks, Bernoulli cartridges, compact disc read only memories, digital versatile disk read only memories, random access memories, or read only memories. Some embodiments include non-transitory media.

The computing device typically includes at least some form of computer-readable media. Computer readable media includes any available media that can be accessed by the computing device. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device.

In some embodiments, one or more computer readable storage media store program instructions, which when executed by one or more processing devices, causes the one or more processing devices to perform one or more of the operations, methods, or functions described herein.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 2:
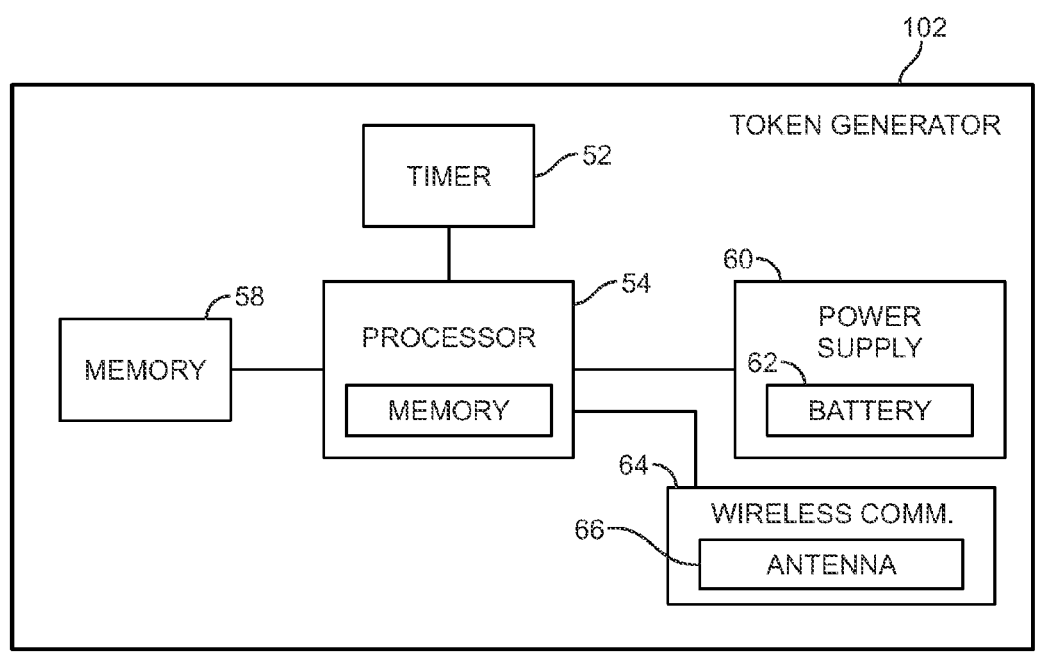
FIG. 2 is schematic block diagram of a token generator.

FIG. 2 is a schematic block diagram of an example token generator 102 that transmits wireless security tokens. In this example, the token generator 102 includes a timer 52, a processor device 54, a memory device 58 (such as including one or more computer readable storage devices), a power supply device 60 (such as including a battery) 62, and a wireless communication device 64 (such as including an antenna 66).

In its most basic configuration, the token generator 102 includes a processor device 54 and a wireless communication device 64.

An example of a wireless communication device 64 is a wireless radio frequency transmitter, such as conforming to one or more of the IEEE 802.11 family of protocols. In some embodiments, the wireless communication device 64 is an Amplitude Modulated (AM) radio transmitter. In other embodiments, the wireless communication device is a frequency modulated (FM) radio transmitter. Other examples of wireless communication devices 64 include Bluetooth® devices, near-field communication devices, Zibee, Bluetooth low energy, Wi-Fi direct devices, or a wide variety of other possible wireless communication devices. Other wireless transmitters are used in other embodiments. The wireless security tokens are typically only detectable within a short distance from the token generator, such as within a few centimeters or within a few meters, but can be broadcast with more or less power and/or with variations in antennas and/or with variations in case design to make the tokens detectable within other ranges. Similarly, the sensitivity of receiving wireless communication devices can be adjusted to increase or reduce token transmission distances.

In some embodiments, the passcode or token is sent from a cloud-based server to a mobile computing device 152 (such as a smartphone) to then be broadcast at least once from the mobile computing device 152 via a Service Set Identifier (SSID) of a Wi-Fi (or other wireless) network created in or by the mobile computing device 152. In this embodiment the mobile computing device 152 actually becomes the token generator. This functionality allows the user to receive cloud-based two factor authentication for a second computing device, such as a laptop, without the need for the user to type anything into the second computing device and without the need for the second computing device to ever join the pseudo-network represented by the locked SSID created by the mobile computing device 152. In some embodiments new passcodes or tokens are sent from a server to the mobile computing device 152 periodically, such as once per minute, or when needed, to be broadcast at least once.

In some embodiments, 64 characters are available for each digit in the passcode or token. Other embodiments use more or less characters for each digit. Still other embodiments vary the amount of characters available for each digit. Some embodiments use a combination of printable and non-printable ASCII characters.

Figure 3:
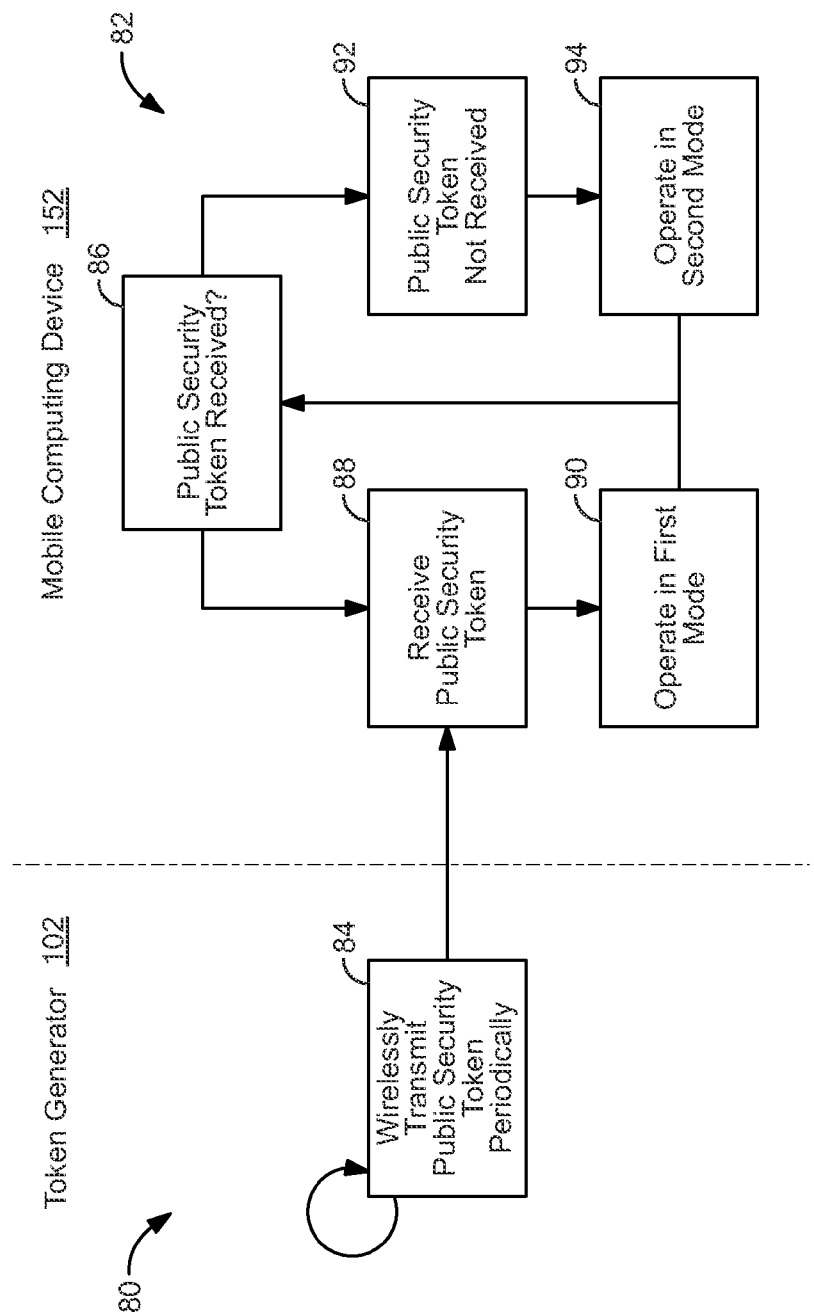
FIG. 3 is a flow chart illustrating an exemplary method of operating a mobile computing device.

FIG. 3 is a flow chart illustrating a method of operating a computing device involving a token generator. In addition, FIG. 3 also illustrates a method of operating a token generator 102, and a method of operating a computing device 152.

As shown in FIG. 3, a computing device 152 operated in the vicinity of a separate token generator 102 can be operated in a first mode 90 when wireless security token(s) are collected by the computing device 152. The receipt of the tokens 88 confirms to the computing device 152 (or another computing device in data communication with the computing device 152) that the token generator 102 is nearby. For example, access to resources (whether locally or in the cloud) can be granted as wireless security tokens are collected, sent to the server for verification, and approved. When wireless security tokens are not collected 92, such as when the token generator 102 is no longer within the vicinity of the computing device 152, the computing device is operated in a second mode 94.

For example, if a computing device stops collecting approved wireless security tokens, actions can be taken to automatically or manually achieve the objectives of the IT help desk. Furthermore, if a computing device 152 is no longer collecting approved wireless security tokens and activity on the device is recognized (herein "unauthorized") then any of the following can take place. Each of the following are examples of the second mode of operation:

(1) information related to the identity of the authorized user is restricted;

(2) the unauthorized user's operation of the computing device 152 is recorded through various means and/or can be communicated to any party of concern;

(3) the current location of the computing device 152 is identified through various means and is communicated to any party of concern;

(4) various functionality of the computing device 152 is restricted;

(5) the owner of the computing device 152 is notified of the breach (or potential breach);

(6) sensitive information on the computing device 152 is communicated to an off-site server and/or is erased from the device 152; and/or (7) various information about the unauthorized user is collected and communicated to any party of concern.

It is noted that people other than corporate employees are also interested in device security, and would likely also benefit from devices that operate in this manner, in some instances. In some embodiments, doctors and nurses can access records using the techniques described herein.

In some embodiments, a computing device 152 is considered to be within the vicinity of a token generator if the distance between the two devices is determined to be less than 50 feet, 20 feet, 15 feet, 10 feet, 6 feet, 5 feet, 4 feet, 3 feet, 2 feet, or 1 foot. In some embodiments, the distance is determined by a strength of a wireless signal, such as measured in dBm. In some embodiments, a computing device 152 is considered to be within the vicinity of a token generator 102 if a wireless security token signal is detected by the receiving device, or if the strength of the wireless security token signal is below the noise floor threshold of the receiving device at the given distance.

In some embodiments, the token generated by a token generator 102 is used as part or all of a Uniform Resource Locator (URL). An example of a URL is www.example.com/example.htm. In some embodiments, the URL is preceded by the scheme name, a colon, and two forward slashes (e.g., http://). The URL can be used to access a resource available through a web server identified by the hostname (e.g., example.com).

In some embodiments, the token is appended to a known URL as a document name. For example, if the token is "1234," a URL can be formed by appending the token to a given hostname (e.g., www.example.com), such as www.example.com/1234.htm.

Tokens generated by a token generator 102 can be determined in advance by a server that has either previously received a copy of the tokens that will be generated, or can compute the tokens based on a known formula, or other methods.

Because of this, the server can store content to be delivered to a computing device 152 through a URL associated with the token. In this way, when a computing device 152 makes a request for the resource at www.example.com/1234.htm, the server responds by providing the appropriate content.

In some embodiments, the token generator 102 changes the token that is broadcast periodically. So, for example, a first token may be transmitted at about 9:01 AM, and a second token is transmitted at about 9:02 AM. A computing device 152 that is within the broadcast range of the token generator 102 can receive the first token at 9:01 AM and access the content at that URL until 9:02 AM. At that time, the computing device 152 receives the second token, and accesses the content at the new URL until 9:03 AM.

In some embodiments, the content associated with a URL is only available during a limited period of time, such that if a computing device 152 attempts to access the URL associated with the first token at 9:03 AM, the content that was previously available is no longer available.

By utilizing a changing token within a URL, a wide variety of applications are possible. Several specific examples will be described below to illustrate some of the possible capabilities.

In some embodiments, a desired resource is broken into a plurality of portions, and each portion is associated with a single token URL. For example, a digital recording of a song is divided into one minute segments. The first segment is made available at a first URL associated with a first token. A computing device 152 can receive the first token only if it is within the broadcast range of the token generator 102, in which case the computing device 152 can access the first one minute segment. If the computing device 152 remains within the broadcast range of the token generator 102, the second token can be received approximately one minute later, which provides access to the second URL where the second segment of the song is available. The computing device 152 can therefore continue to play the song so long as the computing device 152 is near the token generator 102 and continues to receive the changing tokens.

Other resources can be similarly segmented. For example, a confidential message can be transmitted by segmenting the message into a plurality of sections. A first portion of the message can be obtained at a first URL associated with a first token. The second portion of the message can be obtained at a second URL associated with a second token, etc.

In some embodiments, tokens change more frequently than once per minute, such as once per second, or once per millisecond, or less frequently such as once per day.

In some embodiments, many different pages are available at the host associated with different tokens. For example, each page can be permanently, semi-permanently, or temporarily associated with a single word (or even a single letter). In this example, someone randomly entering URLs with random numbers may be able to access pages occasionally, but they would only obtain a single word. Even if multiple words were identified, the person would not know the order of the words and would be unable to determine the overall content of the message. In addition, some embodiments include pages that are associated with a code, but the code is not included in a token. Unless the computing device 152 is within the broadcast range of the token generator 102, the computing device 152 is unable to determine whether the code was part of a token or not, and therefore unable to determine whether the associated word is part of the message.

In case the internal clock of the token generator 102 were to drift, the web pages associated with a token can be operated to remain active for a duration of time greater than the expected time that the code should be generated. For example, in some embodiments a web page is made available 10 seconds earlier than the start of the token broadcast time and remains active for 10 seconds after the token broadcast time. Other embodiments include other durations of time.

In some embodiments, a resource is periodically moved among multiple different URLs. Returning to the example of a digital recording, rather than segmenting the digital recording into different segments, the digital recording can be periodically moved to different URLs. For example, a software application running on the computing device 152 receives a token and accesses the URL associated with the token to begin accessing the digital recording. After a period of time, a second token is received and the software application accesses the next URL associated with the second token to continue to access the digital recording. If the second token is not received, the URL associated with the first token will stop providing access to the digital recording after a duration of time has elapsed. In some embodiments, the digital recording is available at both URLs for a period of time to allow time for the computing device 152 to transition from the first URL to the second URL and to accommodate for a possible drift in the token generator's 102 clock as compared to the server's clock.

Any website can be secured in this manner by moving the content of the website to different URLs associated with a token. The software application can operate to refresh the display periodically, and if a token is not received at the appropriate time, the content will cease to display. Alternatively, other actions can be taken if a token is not received at the appropriate time. So long as the correct token continues to be received, the software application can continue to display the content without any interruption to the user. In some embodiments, the web site is programmed to cause the software application, such as an Internet Browser, to automatically refresh periodically. In some embodiments, the web site is configured to display differently on different devices. In this way, a web site can have a first format when viewed on a stationary computing device, and a second format when viewed on a mobile computing device 152. For example, the second format can display the web site to appear as an app running on the mobile computing device 152.

As another example, a news agency communicates breaking news by posting the news, or portions of the news, on web pages at URLs associated with changing tokens.

As another example, an organization communicates meeting times and locations by posting the information on web pages at URLs associated with changing tokens.

As another example, a web page that collects confidential or sensitive information, such as billing, identity, medical, and/or credit card numbers receives the information through a web page that moves to different URLs periodically while the information is being entered. This shows, for example, that the user entering the information is near to a token generator 102 (such as to provide evidence that the person is the person associated with token generator 102, or that the person is in the vicinity of a token generator 102 that is at a known location). The changing URL also reduces the chance that all of the confidential information will be improperly acquired by another.

In some embodiments, messages or other data can be communicated between two token generating computing devices 152 that are near to each other. For example, one of the computing devices 152 transmits a token within a limited broadcast range. The other computing device 152, located within the broadcast range, receives the token. A URL associated with the token is then used to access the message or communication, or the token is authenticated by a server before granting access to resources. As noted above, only a portion of the message or data may be available at a given URL, while another portion of the message or data is available at a second or subsequent URL. These features can be used within social networking sites, as well as other sites. See, for example, the examples described with reference to FIGS. 7-10 herein.

In some embodiments, the token generator 102 is used to provide access to a communication network. For example, the token generator 102 is used to provide access to a small cellular base station, such as a picocell or femptocell. In one example, the small cellular base station operator permits or denies access by the mobile computing device 152 to the cellular base station based on tokens received from the token generator 102. For example, in some embodiments a software application operating on the mobile computing device 152 determines whether the use should be granted access to the small cellular base station based on tokens received (or a lack thereof). The mobile computing device 152 periodically receives tokens from a token generator 102, such as carried by the user of the mobile computing device 152. The token generator 102 is registered to the user who has previously registered with the small cellular base station network access provider, such as by providing credit card information and authorizing the network access provider to charge the credit card to permit the user to access the network. The software application utilizes the tokens to confirm that the user is authorized to access the network, such as by transmitting the token to a server to verify that access should continue to be permitted. In another possible embodiment, the tokens are delivered directly to the small cellular base station server, which permits or denies access to the network based on the tokens and the status of the user's account associated with the tokens. In some embodiments, each token results in a deduction from a set of previously purchased credits in the user's account, or a charge to the user's credit card, or similar billing method. If the credits are depleted or the credit card cannot be charged, access to the network is terminated. Alternatively, if a token is not received after a period of time, the network access is terminated. In some embodiments, a monthly subscription allows the owner of the token generator to use a certain quantity of tokens to facilitate being boosted by the small cellular base station. In some embodiments, the owner of the token generator 102 can turn the token broadcasts on/off in accordance with her willingness to have the small cellular base station boost the cellular signal. In some embodiments, multiple computing devices 152 near the token generator can receive the same tokens (and therefore can receive a boosted signal through accessing the small cellular base station). This can make the token generator appear to be the source of the increased data speeds, even though the token generator is actually providing access to the small cellular base station. Sometimes this is helpful among a group of friends, colleagues, classmates, etc.

In some embodiments, multiple token generators 102 are used, such as to provide a system and method for secure communication. For example, as described above, a token generator 102 can be used to identify a web site where a portion of desired content is available. In one example, the content is a portion of a live audio, video, or audio and video communication stream. When a computing device 152 receives a token from the token generator 102, the computing device 152 navigates to a URL associated with the token. The communication stream from a remote user is then communicated through that URL by a server computing device for a period of time. A second token is subsequently transmitted by the token generator 102. At that time, the computing device 152 navigates to another web site at the URL associated with the second token. The communication stream is then provided to the user through that URL, while the communication stream ceases to be provided though the prior URL after a period of time. Similarly, communication received from the user is received through the URL and transferred by the server across the network to the intended recipient. In this way, the communication with a remote user can only be followed by a computing device 152 that receives the tokens from the token generator 102.

This communication can be further secured by having both (or all) parties to the communication using a token generator 102. In this example, the remote user also has a token generator 102 that transmits tokens occasionally. A computing device 152 near to the token generator 102 receives the token and accesses the URL associated with the received token. The tokens generated by the remote user's token generator 102 will typically be different from the tokens generated by the other user's token generator 102. As a result, the content is either posted on multiple URL's (so the remote user's computing device accesses a different set of URLs having the same content during the course of the communication) or alternatively, approval is granted to direct both computing devices 152 to one URL in particular, which may be a new URL to both of them if they have both logged into one URL creating system. In other embodiments, all user's token generators 102 produce the same tokens, and therefore direct them all to the same URL(s).

In some embodiments, a computing device 152 is not permitted to participate in a communication unless it is in the vicinity of a token generator 102 and the tokens received match the server predicted tokens.

In some embodiments, a Voice Over Internet Protocol (VOIP) communication (or other form of network or electromagnetic communication) is secured using one or more token generators. For example, at least one characteristic or property of the communication is adjusted based on a token received from the token generator (102). An example of a characteristic is a communication port that the communication is provided through; an encryption key or algorithm for encoding the communication; a frequency, amplitude, phase, quadrature, or other modulation of the communication signal or data; a URL; an IP address; or any other adjustable characteristic or property of the communication.

In some embodiments, the owner or controller of a token generator 102 submits content to an FM radio station in order that the content, once broadcast, can be received and stored in memory on all mobile computing devices 152 tuned to that FM channel.

In some embodiments, the owner of the token generator 102 enters the serial number of his token generator 102 at or near the time of content submission. A request for future tokens is then made to the token generator server by the FM radio station server. Once received, the desired content and known tokens are merged and broadcast via FM radio.

Mobile computing devices 152 can only access that content from storage while receiving the correct tokens, in some embodiments. In some embodiments this process is used, for example, for artistic purposes, social networking, ad hoc product promotions, warnings, group meetings, decentralized media, marketing communications stunts, "progs" (proximity blogs), etc. FM radio stations offer paid or public options for this type of content submission and delivery, in some embodiments. This reduces the amount of data that must be sent across the data communication network, for example.

In some embodiments, a mobile computing device 152 includes more than one FM radio chip to receive multiple FM data delivery channels at one time.

Referring again to FIG. 3, in some embodiments the method further includes a validation operation between operations 88 and 90. The validation operation is performed to validate the public security token before operating in the first mode. In some embodiments, the operation includes comparing the token to data stored in computer readable storage media of the mobile computing device 152, such as in a lookup table. In another embodiment, the token (or a portion of the token) is sent to a token server for validation. Upon receipt of a message validating the token, operation 90 is performed. If the token is not validated, the mobile computing device 152 operates in the second mode 94.

Figure 4:
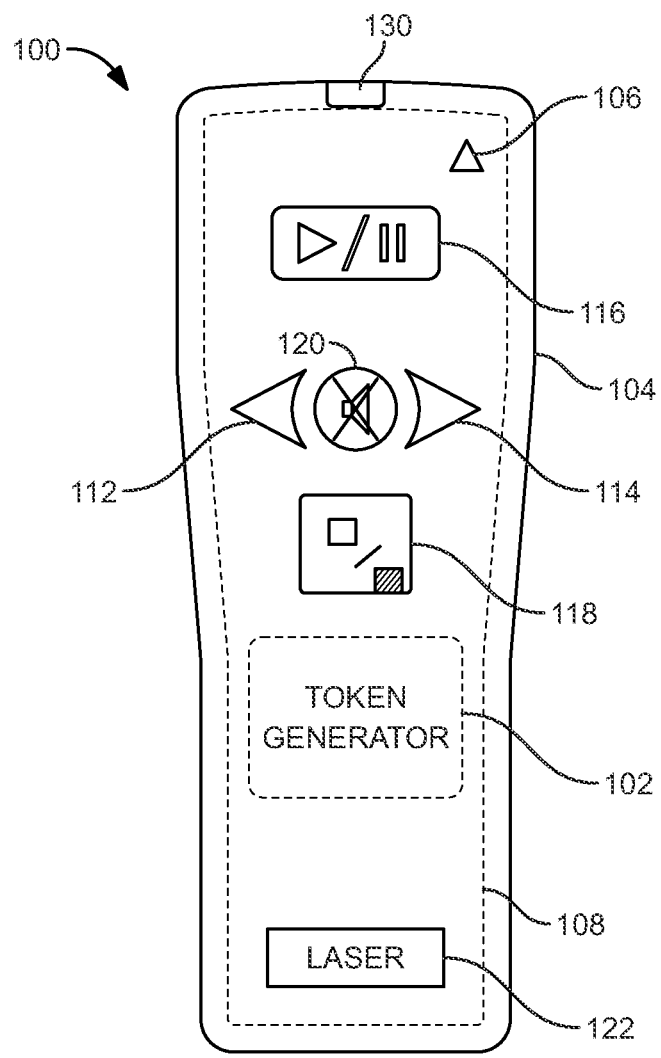
FIG. 4 is a schematic block diagram of an example remote control including a token generator.

FIG. 4 illustrates an example of a remote control 100 including a token generator 102. In this example, the remote control includes a housing 104, one or more user interface devices 106, and electronic circuitry 108.

An example of the token generator 102 is described herein. In one example configuration, the token generator generates one or more tokens, and each token includes at least one code. The codes can be communicated by the electronic circuitry 108, such as in a radio frequency signal.

Housing 104 provides a protective enclosure for electronic circuitry 108. In some embodiments, the housing 104 also forms a handle to be held in a user's hand. In some embodiments, the housing 104 is sized and configured to be held in a user's hand.

User input devices 106 receive input from a user. One or more user input devices 106 can be included. In this example, the user input devices 106 are buttons. Examples of user input devices include a back button 112, a forward button 114, a play/pause button 116, a power button 118, a mute button 120, and a laser button 122.

In some embodiments, content is arranged in an order. An example of this is a set of slides in a presentation. The slides are arranged to have a first slide, a second slide, a third slide, etc., and the slides are assembled in the order in which they are to be displayed. In other words, the second slide is intended to be shown following the first slide.

When displaying content having such an order, the remote control 110 can include a back button 112 and a forward button 114. The back and forward buttons 112 and 114 are used to advance the content according to the predefined order of the content. More specifically, the back button 112 is selected to advance the content in reverse order, and the forward button is selected to advance the content in the predetermined order.

Play/pause button 116 is provided in some embodiments to start and stop the presentation of media content, such as a video or audio presentation.

Power button 118 is provided to turn on or off one or more devices or features. For example, in some embodiments the power button 118 turns on or off a projector. In another example, the power button 118 turns on or off a sound system. In yet another example, the power button 118 is used to enable or disable an application, or a feature of an application, where the application is running on a mobile computing device.

Mute button 120 is provided to toggle sound on and off. Similarly, some embodiments include a volume control adjust sound (e.g., increase or decrease the volume) generated by an audio system.

Laser button 122 toggles on and off a laser pointer 130.

Other input devices 106 are used in other embodiments. For example, some embodiments include a touch screen device configured to receive input from the user.

Electronic circuitry 108 includes a token generator 102 and associated circuitry, such as illustrated in FIG. 2. For example, the token generator 102 includes a processor, a power supply, and a wireless communication device. In addition, in some embodiments the electronic circuitry 108 further includes input/output circuitry to receive input from input devices 106, and a laser beam generator 130.

Upon selection of input devices 106, the token generator 102 transmits a signal including a token. In some embodiments, the signal is generated repeatedly over a period of time, such as 5-10 seconds. The token generated is associated with the particular input device 106 that is selected. In this way, the token includes or is associated with a command in some embodiments. Once received by a computing device 152 (e.g., FIG. 1), the command is performed by the computing device 152. For example, when the forward button 114 is selected, the signal includes a token associated with a forward command. Once the token is received at the computing device 152, the token is interpreted as a forward command, causing the device to advance to the next slide in the presentation.

In another embodiment, the computing device 152 device is programmed to operate as the remote control device 100. For example, selectable controls are displayed in a user interface, which can be selected to perform the same operations as the remote control input devices 106.

Further, in some embodiments a stationary token generator 102 operates as the remote control. In this embodiment, advancement of content in a presentation occurs when a mobile computing device 152 moves into close proximity to the token generator 102 and receives a token. For example, during a tour, a plurality of token generators 102 can be distributed around the site. As the guests move from display to display of the site, the content automatically updates to show the content associated with the nearby display.

A presentation software application can be made to interact with this remote control 100. In some embodiments a presenter's computer responds to an infrared signal from the remote control while other nearby computers (running complimentary software) simultaneously (or shortly thereafter) respond to the tokens received via a network name (such as via a locked 802.11 SSID broadcast from the remote control). In this way, people in the audience can follow along with the presentation automatically, without ceding a greater level of control or computer access to the presenter, the presenter's computer, a network or anyone else.

In some embodiments, a presentation software application includes an export function so that the registered owner or license holder of the program can enter the serial number of their remote control into the program prior to an export function, resulting in that particular remote control's 100 tokens being merged into the exported presentation material. Exporting into an app, or posting material to a website, or exporting into a non-editable version of the original software application are all considered helpful uses of this embodiment. In some embodiments, certain digits within the locked 802.11 network name can be programmed to cause the exported apps to perform varying levels of functionality. For example, if the $32^{nd}$ digit of an SSID broadcasted by a remote control is the letter "A" that can mean that all exported software should respond to the first 31 digits, whereas if the $32^{nd}$ digit of that SSID is the character "B" then the only premium software should respond. This type of functionality can be useful in a variety of settings. By nonlimiting example, a professor at a university could export his Microsoft PowerPoint program to include a premium version and an auditing version. Those students who paid for the class can access the premium version, while those students auditing the class could only access the auditing version. Many similar uses are possible in other embodiments.

In some embodiments, user's can opt in or out of functional features. For example, a student in a university auditorium may choose to click on link(s) within an exported app without being redirected to the next app page at the moment the professor clicks the remote control. This avoids interrupting the student's online experience. The same student may choose to be notified of the occurrence of a "next slide" event or may alternatively choose a short extension prior to being redirected to the next app page in the exported app.

In some embodiments, presentation templates are provided. The templates can be edited in a presentation software application to add content. Content can include, for example, images, videos, text, animations, audio, links to web pages, or other desired content. In some embodiments, logos or other identifying information can be added to the templates to brand the presentation for a particular individual, company, or organization.

Figure 5:
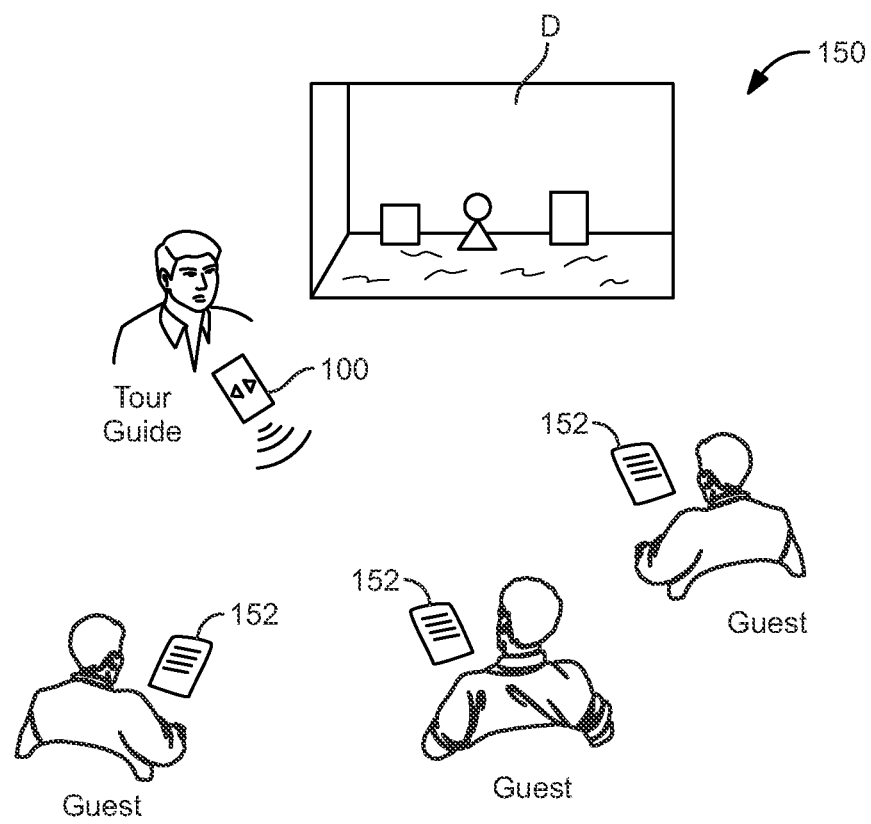
FIG. 5 is a schematic diagram of a system and method for providing content during a tour.
Figure 6:
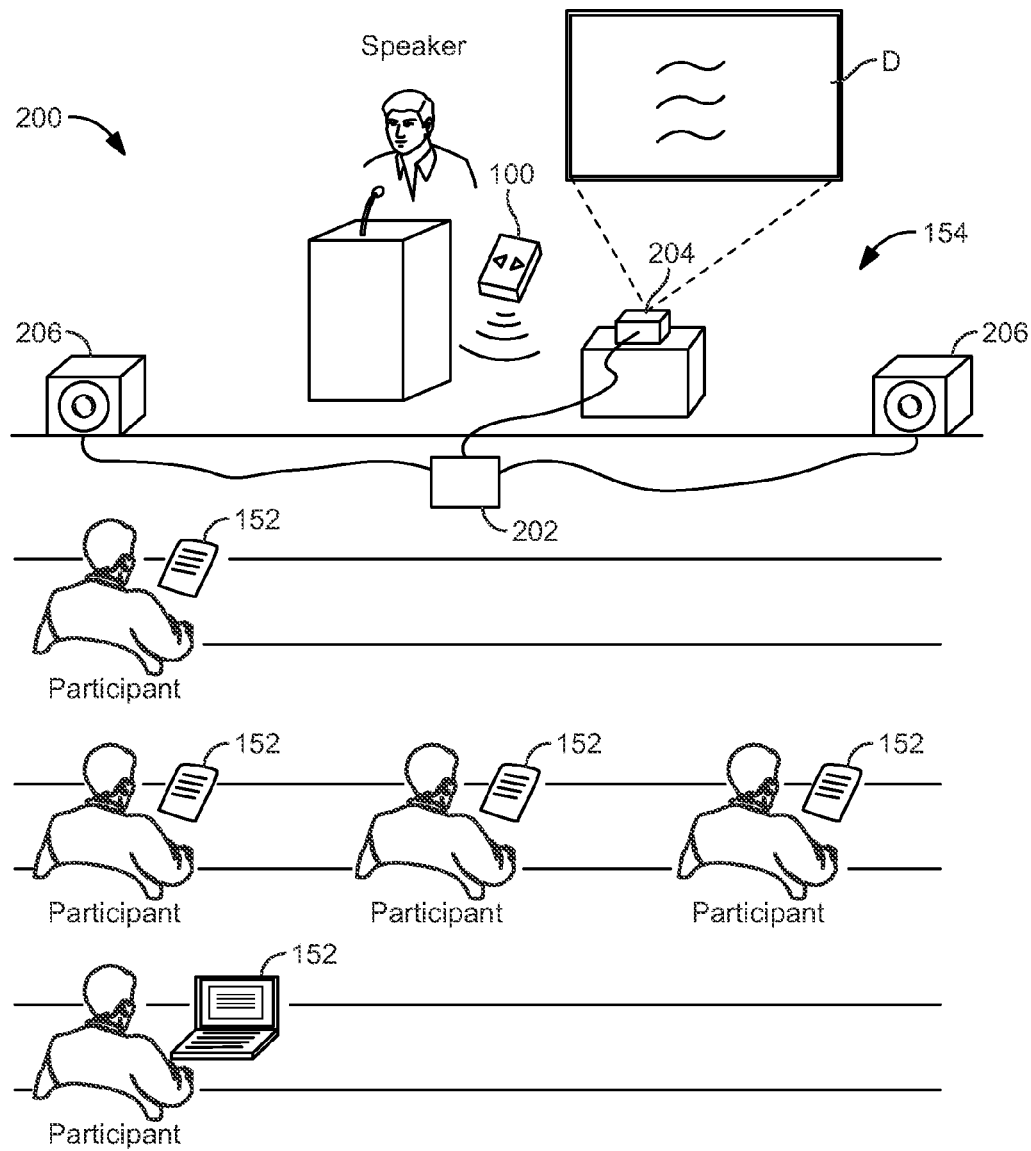
FIG. 6 is a schematic diagram of a system and method for providing content during a lecture.

FIGS. 5-6 illustrate exemplary systems utilizing the remote control 100. FIG. 5 is a schematic diagram of a system 150 and method for providing content during a tour. In this example, a tour guide is providing a tour to several guests. The tour guide carries the remote control 100 while giving the tour. Guests carry mobile computing devices 152, such as smartphones or tablet computers (e.g., an iPad tablet computer). The mobile computing devices 152 include a wireless communication device configured to receive the signal generated by the remote control 100. The tour guide can adjust the content displayed on the mobile computing devices 152. For example, as the tour guide leads the guests to display D, the tour guide selects the forward button 114. The signal generated by the remote control 100 is received by the mobile computing devices, which respond to the signal by displaying content on mobile computing devices 152 associated with display D.

In some embodiments, the content is pre-loaded on the mobile computing device 152. A software application is also stored in memory of the mobile computing device 152, which operates to control the presentation of the content on the mobile computing device 152 in response to signals received from the remote control 100. In some embodiments, the application prompts the guest (or other user) for information at the beginning of the tour, such as the tour guide's name, an ID number for the tour, a serial number on the remote control 100, or other information. This information can then be used by the software application to grant access to the content (while also preventing those without the information from gaining access to the content). The information is also useful to allow the mobile computing device 152 to distinguish between signals received from multiple remote controls—so that only the remote control 100 associated with the information entered is used to control the content on the mobile computing device 152.

FIG. 6 is a schematic diagram of a system 200 and method for providing content during a lecture. For example, the lecture may be a business presentation, a lecture at an educational institution, or any other lecture having associated content to be displayed on computing devices 152. In this example, system 200 includes remote control 100, mobile computing devices 152, and audiovisual system 154. In this example, the audiovisual system 154 includes a control unit 202, projector 204, and speakers 206.

The speaker uses the remote control to advance the presentation on mobile computing devices 152. In addition, the audiovisual system 202 receives the signal from the remote control 100 and also adjusts display D generated by the projector 204. In some embodiments, the audiovisual system 202 receives the token generated by the remote control and adjusts the display in the same way as the mobile computing devices 152. In another embodiment, however, remote control 100 includes a second communication device that operates to control the audiovisual system. An example of a second communication device is light emitting diode, such as an infrared diode or near infrared diode. Other communication devices are used in other embodiments.

In some embodiments, some of the input devices 106 (shown in FIG. 4) of remote control 100 are used to control the presentation of content on mobile computing devices 152, while other input devices 106 are used to control the operation of the audiovisual system 154. Further, in some embodiments, some input devices 106 are used to control both the mobile computing devices and the audiovisual system 154.

For example, in some embodiments the mobile computing devices 152 do not generate sound. This could be disruptive if each mobile computing device 152 was playing its own audio content—particularly if the audio was not closely synchronized. To prevent this, the sound is generated by the audiovisual system 202, and input devices 106 associated with the sound (e.g., button 120) are used to adjust the operation of the audiovisual system 202.

Various presentation software applications can be used to present content, such as Microsoft's PowerPoint® presentation graphics program, Apple's Keynote® application program, and Prezi.

In some embodiments, remote control 100 transmits a token including a URL, a part of a URL, or data that can be used to obtain a URL, such as described in more detail herein.

Figure 7:
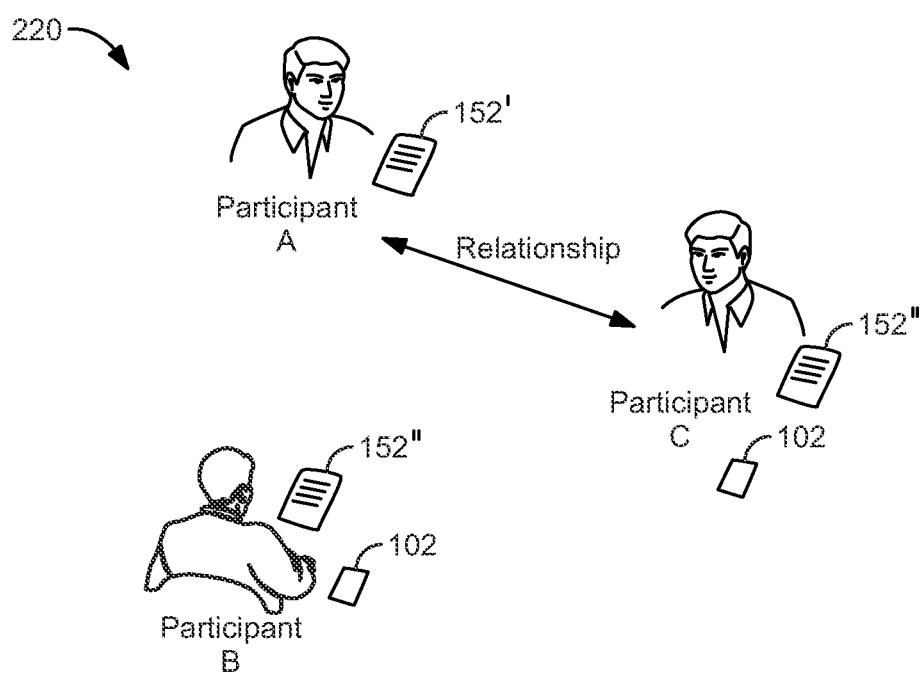
FIG. 7 is a schematic diagram of an example system for social networking.
Figure 8:
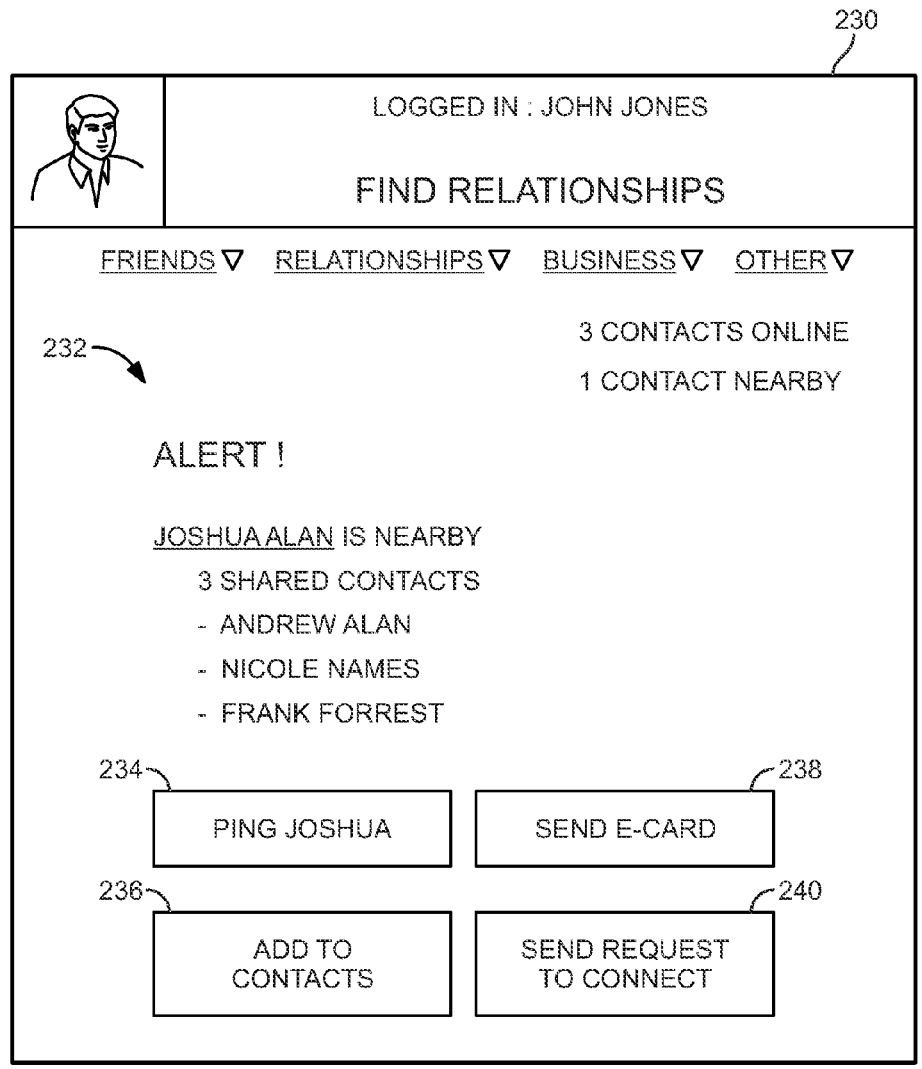
FIG. 8 is a screen shot of an example user interface displayed by the system shown in FIG. 7.

FIGS. 7-8 illustrate a system 220 and method for social networking. In this example, the system 220 includes a plurality of mobile computing devices 152' and 152". Some embodiments further include separate token generators 102.

In the example illustrated in FIG. 7, a group of participants are gathered at a location, including Participants A, B, C. Each participant has a mobile computing device, whether a token generating mobile computing device 152' or a non-token generating mobile computing device 152". The token generating mobile computing devices 152' are token generators 102 that are programmed to broadcast a token, or incorporate a token generator 102. The mobile computing devices 152" are not programmed to broadcast a token, and so the participants B and C also have a separate token generator 102 that operates to broadcast the token(s).

When participants are near enough to each other, the tokens broadcast by a token generator 152' or 102 can be received by one or more of the mobile computing devices 152' or 152". For example, when Participant A's mobile computing device 152' is within the broadcast range of Participant C's token generator 102, Participant A's mobile computing device can receive the tokens transmitted from Participant C's token generator 102.

When a token is received, the token can be evaluated by a mobile computing devices 152' or 152" (or transmitted to a server for evaluation) to determine if Participants A and C have a relationship. As shown in FIG. 7, a relationship has been identified between Participants A and C.

FIG. 8 is a screen shot of an example user interface 230, such as displayed on Participant A's mobile computing device 152', shown in FIG. 7.

In this example, a social networking application running on the mobile computing device 152' or 152" caused the mobile computing device 152' or 152" to detect tokens broadcast from token generators. The tokens are then evaluated with relationship data for the user. The relationship data may be stored on the mobile computing device 152' or 152", or in a data storage device accessible through the network. If a relationship is found, user interface 230 can display information about the identified relationship. The relationship can include an existing relationship, a potential future relationship, or a suggested relationship based on shared characteristics, for example.

In the example shown in FIG. 8, Participant A (John James) is alerted by user interface 230 that Participant C (Joshua Alan) is nearby, and that Participant A and Participant C have three common relationships, including Andrew Alan, Nicole James, and Frank Forrest. In some embodiments a profile photograph of Participant C is displayed, so that Participant A can look around and try to find the person.

In some embodiments, the user interface 230 displays a set of actions that can be taken in response to the identification of a relationship, by displaying selectable controls 234, 236, 238, and 240.

For example, a selectable control 234 can be selected to ping Participant C. The ping transmission can occur across a network such as the Internet or across a cellular network, or may also occur through a direct wireless data connection between nearby computing devices, or as a subsequent token broadcast. If selected, the system operates to generate a display (or other detectable alert) to inform Participant C that Participant A is nearby, and perhaps that Participant A is interested in meeting or locating Participant C.

The selectable control 236 can be selected to add the identified contact (Participant C) to a contact list for future reference.

The selectable control 238 can be selected to send an electronic business card to the contact (Participant C). In another embodiment, an e-mail, text message, or other electronic message can be sent to the contact (Participant C).

The selectable control 240 can be selected to request to connect to the person. This is useful, for example, to politely request permission from the person before attempting to meet, in case Participant C is currently busy or otherwise not available to talk with Participant A. Upon selection, a request is displayed to Participant C, providing Participant C with the option to accept, decline, or ignore the request, for example. If the request is accepted, the system can operate to guide Participant A to the current location of Participant C, and vice versa. For example, a map or arrow is displayed that shows the location of the other participant based on directional data associated with the signal. In another embodiment, messages can be used to arrange a meeting place (e.g., "meet at the front entrance"), or a telephone call can be initiated for oral communication.

The system can be used to identify a variety of different relationships. For example, the system can identify friends, demographics, people with common interests, business relationships, people sharing a common characteristic (such as a mutual relationship, a common membership or interest in a club, group, organization, or company, etc.). In some embodiments, proximity is a common characteristic.

In some embodiments, the system includes an online social networking system and database, and utilizes the system and database to identify relationships. Examples of online social networking systems include systems by Facebook, Inc. of Palo Alto, Calif.; eHarmony, Inc of Santa Monica, Calif.; Meetup Inc. of New York, N.Y.; LinkedIn Corporation of Mountain View, Calif., or other social networking systems.

Figure 9:
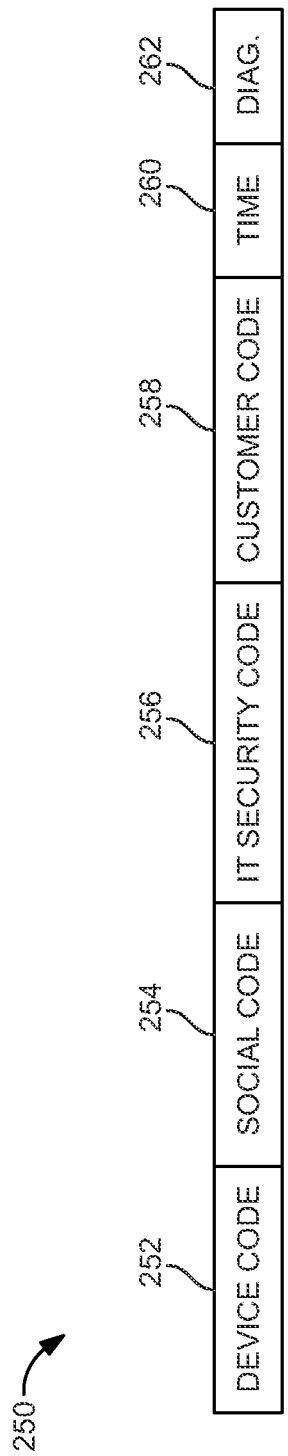
FIG. 9 is a schematic block diagram of an example token transmitted by a token generator.

FIG. 9 is a schematic block diagram of an example token 250 transmitted by a token generator 102. In this example, the token 250 includes a plurality of token portions, including a first portion 252, a second portion 254, a third portion 256, a fourth portion 258, a fifth portion 260, and a sixth portion 262. More or fewer token portions are used in other embodiments.

The token encodes data that can be used for a variety of purposes. For example, a first portion 252 of the token includes a device code. An example of a device code is three digits, such as "WP*" that identifies a type of device that is generating the token. Other embodiments utilize device codes having more or fewer than 3 digits. When then token is included in an SSID, it is useful to have a device code that identifies the SSID as a token generated by a token generator, rather than the identification of a wireless network. This permits a receiving computing device, for example, to avoid processing SSID's that do not have one of a predetermined set of device codes. In addition, the device code can identify the type of device that is generating the token 250.

A second portion 254 is a social code. The social code is used for social networking applications, such as illustrated and described in FIGS. 7-8. For example, the social networking code includes 7 digits, which can be made up of any combination of numbers, letters, or symbols (referred to herein as alphanumeric characters).

A third portion 256 is an IT security code or company code. The IT security code or company code can be used, for example, to permit access to a company's secure network, or to permit access to the building itself by unlocking doors or permitting an elevator to stop at a secured floor.

A fourth portion 258 is a customer code. The customer code can identify the user that is authorized to use the token generator. An example of a customer code is a 5 digit alphanumeric code.

A fifth portion 260 is a time code. The time code includes data identifying a current time when the token is transmitted. An example of a time code is an 8 digit alphanumeric code.

A sixth portion 262 is a diagnostic code, which conveys diagnostic data. An example of a diagnostic code is a two digit alphanumeric code.

As noted above, other embodiments can include other quantities of codes, and other lengths of tokens and token portions, and many other types of token portions. For example, anything that can be measured, detected, or digitally communicated can be included in a token.

In some embodiments, tokens that are transmitted by a token generator change periodically. For example, in some embodiments the second and third code portions change once per minute. Other portions may not change, or may change less frequently in some embodiments. Other portions, such as the time code 260, may change more frequently, such as with each transmission of the token. A diagnostic code in the sixth code portion may change only as needed. Some portions may only be populated at certain times, or under certain circumstances. For example, some portions may only be populated when other portions are not populated.

An example providing further explanation of the use of the different portions of the token 250 is illustrated and described with reference to FIG. 10.

Figure 10:
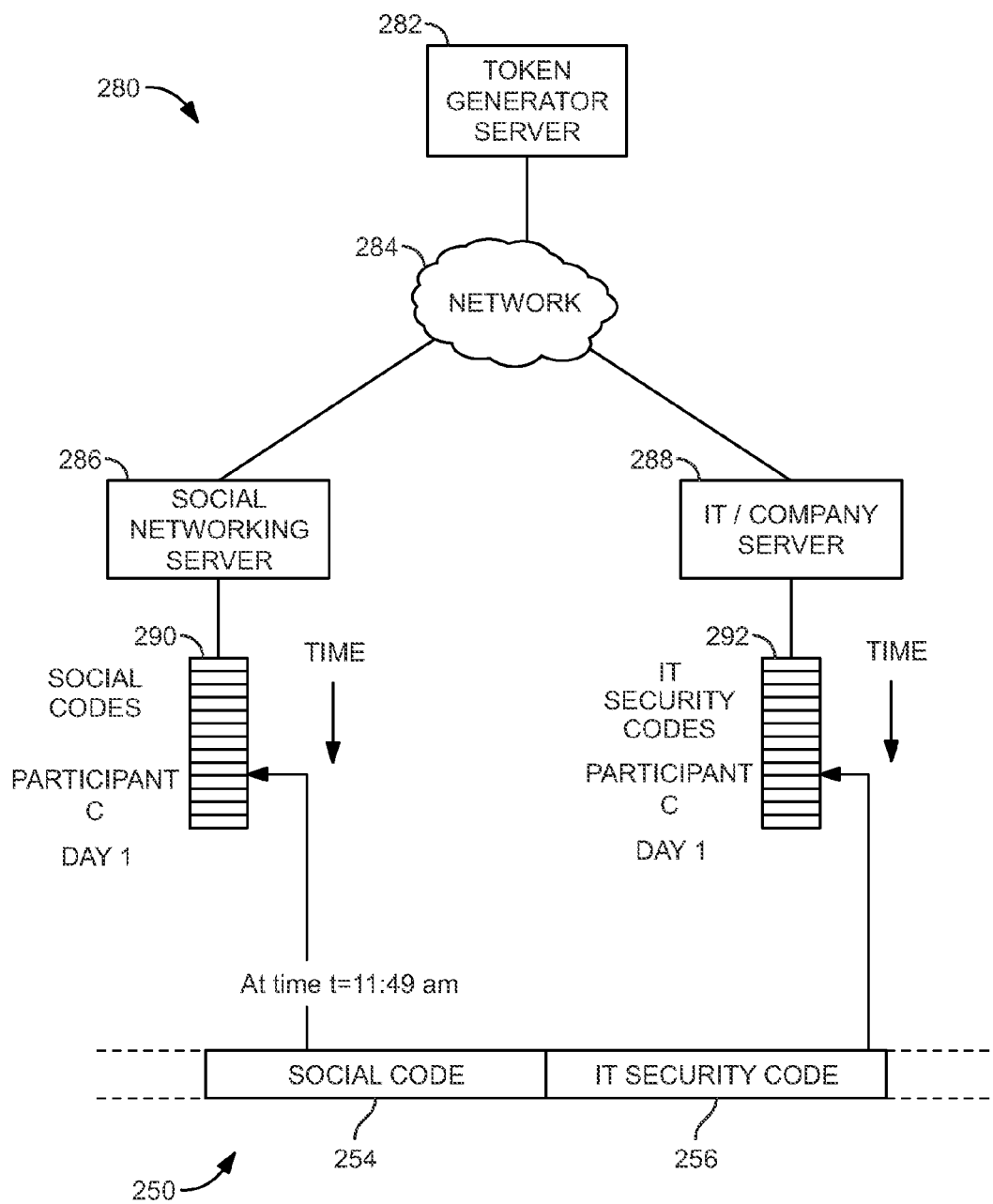
FIG. 10 is a schematic block diagram of an example system including a token generator server, a social networking server, and an IT/company server.

FIG. 10 is a schematic block diagram of an example system 280 including a token generator server 282, a communication network 284, a social networking server 286, and an IT/company server 288.

In this example, the token generator server 282 generates tokens (or algorithms for generating tokens). The tokens can be generated according to a set of rules, and can also utilize a physical random number generator or by an algorithm. In some embodiments, the tokens that are generated are programmed into token generators to be transmitted at the identified times. Alternatively, in some embodiments tokens are generated by the token generator server 282, but are only sent to a token generator when the token is needed, such as through a network such as the Internet or a cellular network. Portions of the tokens are provided to other servers in some embodiments, such as the social networking server 286 and the IT/company server 288.

The social networking server 286 is provided with a set of social codes 290 that will be generated by a token generator 102 associated with Participant C throughout a given day, as well as other participants, and other days. These are sometimes referred to as anticipated or predicted codes.

The IT/company server 288 is provided with a different set of IT security codes that will be generated by the same token generator associated with Participant C throughout the same given day, as well as other participants and other days. These are also sometimes referred to as anticipated or predicted codes.

The code portions 290 and 292 can then be used by the servers 286 and 288 to identify a token that is received. For example, if a token 250 is transmitted by a token generator at 11:49 AM on a given day, the token 250 may be received by a computing device and transmitted to the social networking server 286 and/or to the IT/company server 288.

Upon receipt of the complete token 250, the servers 286 and/or 288 evaluate the token. For example, the social networking server 286 retrieves the social code 254 from the full token 250 and compares the received social code 254 to a code within the set of predicted codes 290 to determine whether they match. A match permits the server to authenticate that the code was likely generated by a token generator 102 associated with Participant C, and then, knowing that information, to take further action, such as to determine whether the user of the computing device that received the token has any relationships with Participant C.

As another example, when the full token 250 is received by IT/company server 288, the server 288 retrieves the IT security code 256 from within the token 250 and compares the code with the predicted code within the set of predicted codes 292. If a match is found, the server 288 determines that the code is associated with Participant C, and subsequent action can be taken, such as to permit Participant C access to the building, or to permit Participant C access to a secure network.

In this example, the social networking server 286 is not provided the predicted codes 292 that are provided to the IT/company server 288. This is beneficial because it permits portions of the known code to be controlled by different entities. If the predicted codes 292 are only shared with the IT/company server 288, the codes can be maintained in confidence by the IT/company server 288 to prevent others from accessing the predicted codes, and therefore can be used for more secure applications, such as to permit access to a building or to permit access to a secured network or network resource.

On the other hand, the social codes 254 can be more widely distributed, such as to a variety of different social networking servers 286, where the codes will be used for applications that do not require as much security, such as the example social networking uses described herein.

Figure 11:
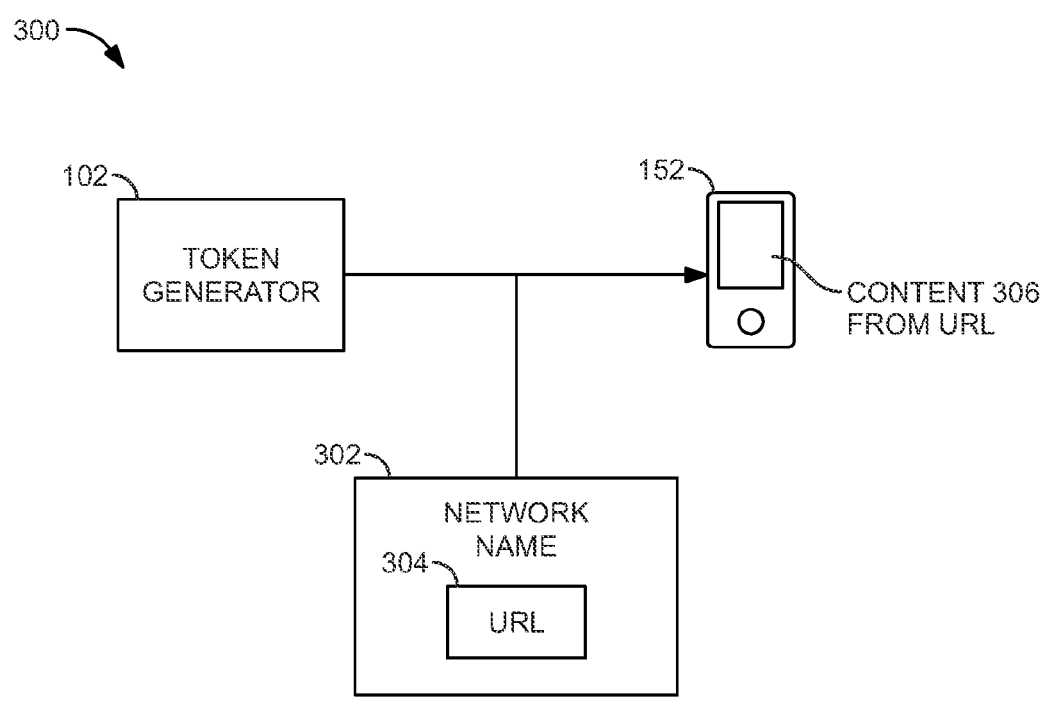
FIG. 11 illustrates an example system for communicating a URL to a mobile computing device.

FIG. 11 illustrates an example system for communicating a URL to a mobile computing device, and also illustrates an example method of communicating a URL to a mobile computing device. In this example, the system 300 includes a token generator 102 and a mobile computing device 152. Although the mobile computing device is described, non-mobile computing devices can also be used in other embodiments.

The token generator 102 includes at least a processing device and a wireless communication device. Another example of a token generator 102 is illustrated and described with reference to FIG. 2. The token generator 102 wirelessly transmits data in a public transmission that can be received by a mobile computing device 152. One example of such a public transmission is a network name. A more specific example is a service set identifier (SSID), such as defined by the IEEE 802.11 family of wireless communication protocols. The network name can be received by the mobile computing device 152 without requiring the mobile computing device 152 to connect to a network identified by the network name.

In another embodiment, other network names can be used. For example, in some embodiments the network name is a Bluetooth device name. In some embodiments, the network name identifies a wireless personal area network (WPAN), a wireless local area network (WLAN), a wireless mesh network, a wireless wide area network, or a mobile device network. In another embodiment, the public transmission is broadcast from or through one of these networks in such a way that the receiving device does not have to connect to the network in order to receive the transmission.

In some embodiments, the transmission from the token generator 102 includes a uniform resource locator (URL) 304. In other embodiments, the transmission includes a portion of a URL or data associated with a URL (e.g., data that can be used to obtain a URL or portion of a URL).

A URL can include one or more of the following: a scheme name (e.g., http:), a colon, a domain name (e.g., "www.example.org"), an IP address (e.g., "127.0.0.1"), a port number (e.g., "21"), a path (e.g., "/123.html"), and a query string (e.g., "query=example+string").

As one example, the network name 302 is the URL 304, such as "http://www.example.com."

When the mobile computing device 152 is within the broadcast range of the token generator 102, the mobile computing device 152 operates to receive the network name 302 and, as a result, the URL 304. The network name is stored in a computer readable storage medium, and can be used to access content 306 using the URL 304.

For example, the mobile computing device 152 uses the URL 304 to access a web site identified by the URL 304 and to download and/or display the content 306 to the user.

Figure 12:
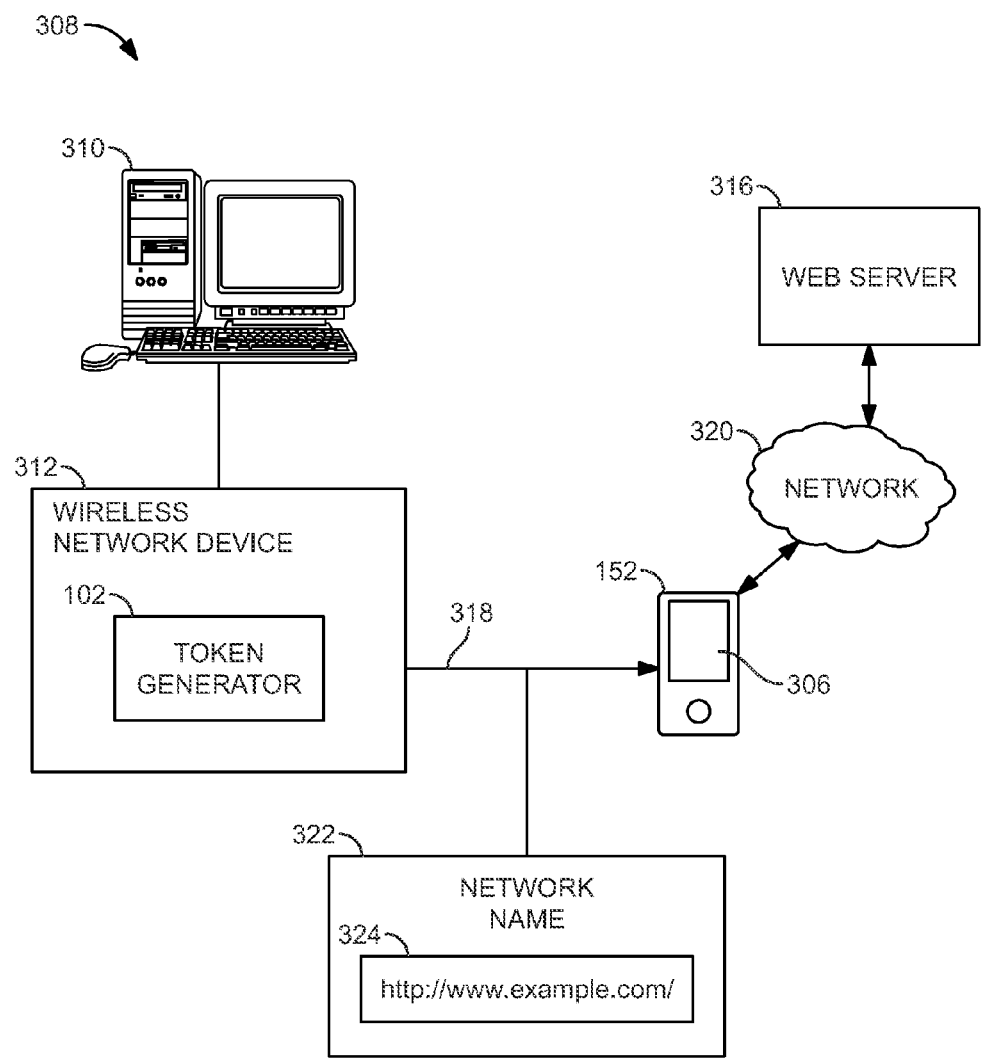
FIG. 12 is a schematic block diagram of an example content delivery system for delivering content to a computing device.

FIG. 12 is a schematic block diagram of an example content delivery system 308 for delivering content to a computing device, such as the mobile computing device 152. In this example, the content delivery system 308 includes a computing device 310, wireless network device 312 (such as a wireless access point or wireless router) including a token generator 102, the mobile computing device 152, and a web server 316. In this example, the wireless network device 312 wirelessly transmits 318 a network name 322 including a URL 324. The web server communicates across a data communication network 320.

The computing device 310 is any suitable computing device (such as a personal computer, mobile computing device, and the like) that is configured to communicate with the wireless network device 312, such as through a USB or other suitable data communication connection and communication protocol. In some embodiments, the wireless network device 312 includes an interface configured to adjust settings of the wireless network device 312. For example, in some wireless network devices 312 the interface can be accessed through an IP address entered into a browser software application. The name 322 of the wireless network is then set to include the URL 324. Other interfaces are used in other embodiments.

In an example embodiment, a user utilizes the computing device 310 to set the name 322 of the wireless network device 312. For example, the user is prompted to enter a network name 322, and the user enters a URL 324. The URL is then saved in computer readable storage medium of the wireless network device 312 and transmitted 318 as the network name 322.

The wireless network device 312 is, in some embodiments, a device that allows wireless devices to connect to a wired network, such as a wireless access point or a wireless router. A cellular base station is another example of a wireless network device 312.

The wireless network device 312 includes a token generator 102 (or, alternatively, the wireless network device 312 is a token generator 102), and operates to generate wireless transmissions 318. Some embodiments include multiple token generators. Some embodiments include multiple wireless communication devices. Some embodiments operate to generate multiple tokens, such as to cycle through a set of multiple tokens. At least one of the wireless transmissions 318 includes a network name 322, in some embodiments, in which the URL 324 is transmitted. For example, the URL 324 is part of a locked SSID. In some embodiments the wireless network device 312 alternates between two or more transmissions, such as the URL 324 and a non-URL. For example, the wireless network device 312 can alternate between "www.joescoffee.com" and "Joe's Coffee."

The mobile computing device 152 receives the network name 322 and saves the URL 324. In some embodiments the URL 324 is encrypted prior to saving. In some embodiments a filtering operation is performed to evaluate the URL prior to saving, as discussed in more detail herein, so that undesired URLs are not saved or visited.

The mobile computing device 152 can then use the URL 324 to perform one of a variety of possible actions. For example, the URL is displayed to the user. As another example, the URL is used to access content 306 from a web server 316, where the content is identified by or available at the URL. The content is retrieved from the server 316 across network 320.

The network 320 can include multiple networks, such as one or more of the Internet, a local area network, a cellular network, and the like, which cooperatively form the network 320.

Figure 13:
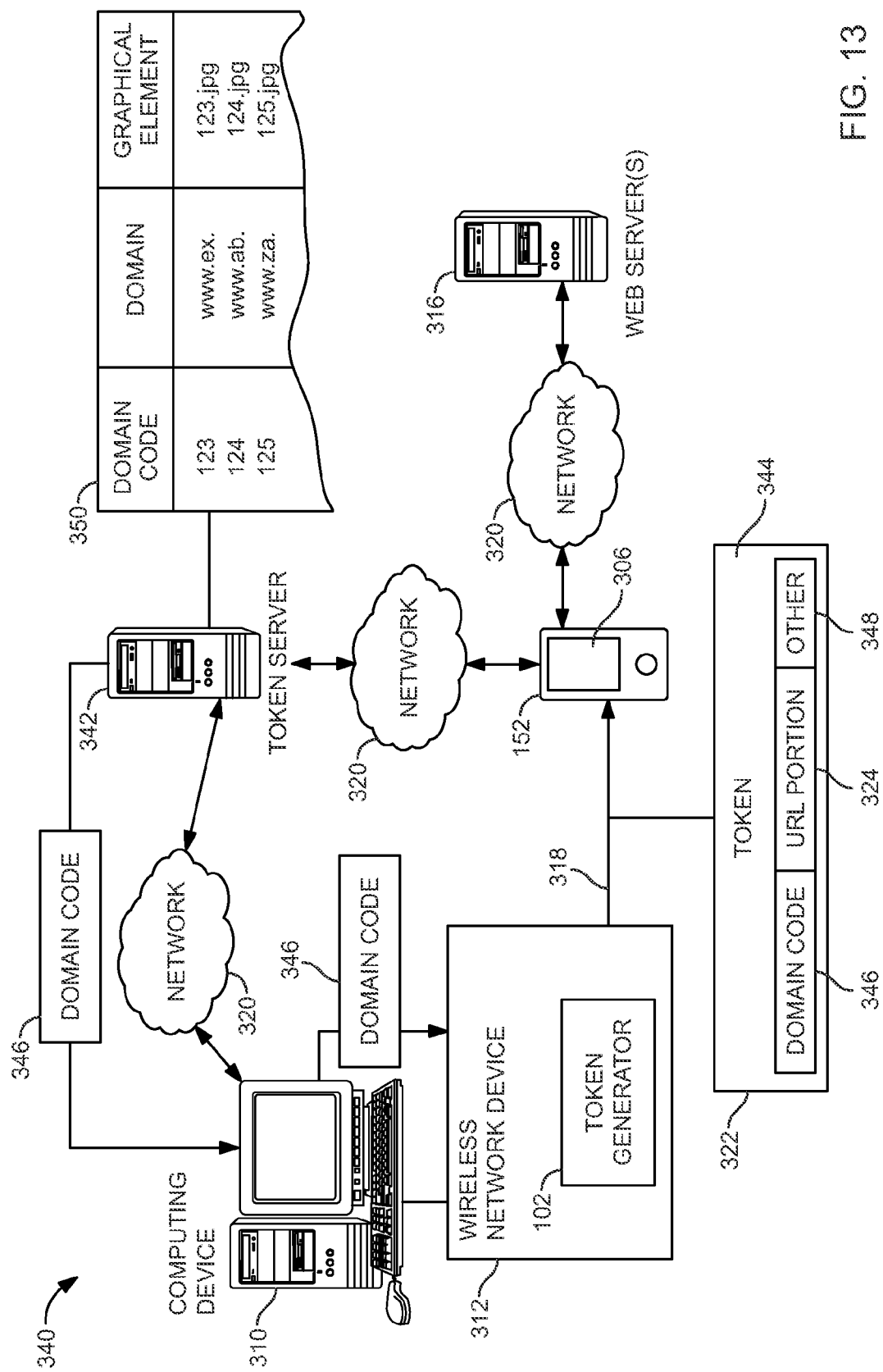
FIG. 13 is a schematic block diagram of another example content delivery system.

FIG. 13 is a schematic block diagram of an example content delivery system 340. In this example, the content delivery system includes a computing device 310, wireless network device 312 (such as a wireless access point or wireless router) including a token generator 102, the mobile computing device 152, a web server 316, and a token server 342. In this example, the wireless network device 312 wirelessly transmits 318 a network name 322 including a token 344, which includes at least a portion of a URL 324, or data associated with—or that can be used to obtain—a URL. At least some of the data communication within the content delivery system can be transmitted across network 320.

In this example, the token 344 includes a domain code 346, at least a portion of a URL 324, and optionally other data 348. The domain code 346 is data associated with a portion of a URL, such as the domain. An example of a domain is "www.example.com." In some embodiments, the domain code 346 is data that can be used to identify a domain. For example, the domain code 346 can be sent to a token server 342, which determines the domain associated with the domain code 346 and sends the domain to the requester. The domain can then be combined with the URL portion 324 to access content from web server 316, such as using a browser software application.

In some embodiments, the wireless network device 312 and token generator 102 need to be supplied with the domain code 346. To do so, a computing device 310 is used to access a token server 342 (or another server) to complete a registration process. An example of the registration process is illustrated and described with reference to FIG. 14-15. Upon successful registration, the domain code 346 is supplied to the computing device 310.

The domain code 346 can then be supplied to the wireless network device 312 and the token generator 102, where it is saved, in some embodiments. In some embodiments the domain codes change periodically, such as every few weeks or months. This can prevent or reduce mapping of the codes by third parties.

The wireless network device 312 then initiates a wireless transmission of token 344, which may be repeated periodically. In some embodiments the wireless transmission includes the token 344 as a network name. Other embodiments transmit the token in a message other than a network name. The token 344 includes, for example, the domain code 346, at least a portion of a URL 324, and other data 348, if any.

When a mobile computing device 152 is within the broadcast range of the wireless network device 312, the mobile computing device 152 operates to receive the token 344, including the domain code 346, URL portion 324, and other data 348.

The mobile computing device 152 sends the domain code 346 to token server 342. In some embodiments additional data from token 344 is also sent. In some embodiments, the additional data includes a unique identifier of the mobile computing device 152, a time stamp (e.g., cellular time stamp), a signal strength of the token generator 102, etc.

Token server 342 receives the domain code 346 from the mobile computing device 152, and identifies a domain identified by the domain code 346. In one example embodiment, the token server 342 includes a database that associates domain codes with domains. In some embodiments, the database includes one or more lookup tables 350. The token server 342 locates the domain code 346 in the lookup table 350, and retrieves the domain identified by the domain code 346. In some embodiments, additional content is also stored in the database, such as a graphical element associated with the domain code. The database may also include a brief text-based description or name associated with the domain. The domain and the graphical element (and any other desired content from the token server 342 database) are returned to the mobile computing device 152.

In some embodiments, the token server 342 performs additional steps to evaluate the domain code before returning the domain. For example, in some embodiments the other data 348 of token 344 includes a verification code. The verification code is a code assigned to the token generator 102 for transmission during a predetermined period of time, for example. The period of time can be one minute, one hour, one day, one week, one month, or any other period of time. The verification code can be generated by the token generator 102 according to a predetermined algorithm known to the token server, or can be obtained from a lookup table provided by the token server, for example. Upon receipt of the domain code 346 and the verification code, the token server 342 determines whether the verification code is associated with the domain code 346, and whether the time at which the token 344 was transmitted by wireless network device 312 is within a predetermined period of time. If the verification code is determined to be a valid code, the token server 342 proceeds to return the domain and graphical element, and possibly other data, to the mobile computing device 152. If not, an error message is returned. Alternatively, if the verification code is not validated, no further action may occur, or another different action may occur.

Once the mobile computing device 152 receives the domain from token server 342, the mobile computing device 152 generates the complete URL by combining the domain with the URL portion 324. For example, the domain "www.example.com" is combined with the URL portion 324 "/123.html" to generate the full URL "www.example.com/123.html."

In some embodiments, the mobile computing device 152 uses the URL to retrieve content 306 from the web server 316. Any content 306 that can be supplied by a web server and identified by a URL can be supplied. In addition, any action that can be accomplished with a URL can be performed using the URL. The URL can include data in addition to the domain and a path, such as a search query, a command, program code (including markup language (e.g., XML and HTML), program code (e.g., Java, C#, C, etc.), or executable binary code, etc.). A token can similarly include such data, including program code. The network name can also include such data, including program code. In some embodiments, the content that is provided does not pass through the token server 342, and so the token server has no record of what content has been provided by web server 316 to mobile computing device 152. In addition, in some embodiments the token server 342 does not even know the full URL for the content. User privacy is therefore protected.

In some embodiments, the mobile computing device 152 receives the domain and the graphical element from the token server 342 and stores the URL (including the domain and the path, etc.), and the graphical element. In some embodiments, the data is encrypted prior to storage in a computer readable storage medium of the mobile computing device. Multiple URLs and graphical elements can be stored in this manner as the mobile computing device 152 moves into the broadcast range of multiple different wireless network devices 312. In some embodiments, the mobile computing device 152 displays a list showing at least some of the tokens that have been collected. For example, the list can include the graphical element. An example is illustrated and described in more detail with reference to FIG. 16. The mobile computing device 152 can receive the domain and graphical element data prior to ever encountering a token generator 102 that matches it, in some embodiments. For example, at the time that the software application is loaded onto the mobile computing device.

Exemplary uses of the system shown in FIG. 13 include the following. The system can be used to enhance a parade. For example, each float in the parade includes a token generator 102. People watching the parade can collect tokens 344 on the mobile computing device 152 to access additional content. As another example, token generators can be arranged at exhibits of a museum, and mobile computing devices 152 can be used to obtain additional content relating to the exhibits. Other examples include tours (cities, museums, historical societies, etc.), airports (maps, visitor information, local amenities, etc.), taxis and buses (advertisements), corporations (scrolling news relevant by department, on campus social networking features, etc.), universities (link to news site or a social networking page), residential real estate open houses (e.g., to show room by room features of a home, etc.), musicians (making their own exclusive downloads available during concerts, etc.), and education (to register attendance, device agnostic Internet presentations, etc.). Other embodiments are used for other purposes.

In some embodiments, wireless network device 312 transmits multiple (or even many) different tokens. The tokens can be transmitted simultaneously using multiple token generators, or consecutively by cycling through a set of tokens. As one example, the wireless network device is arranged in a public space, such as connected to a street light where the wireless network device 312 can receive a constant power supply and solar recharging, for example. The wireless network device 312 can operate to transmit tokens for a variety of businesses or people, such as those businesses that are on that same block. In some embodiments, the system forms a billboard system that displays content on mobile computing device 152. This wireless network device 312 can be referred to as a multi-subscriber beacon.

Rather than cycling through a large number of tokens, another possible embodiment transmits a single URL, a portion of a URL, or data that can be used to obtain a URL. A web site is then accessed using the URL with the mobile computing device. The web site includes data defining multiple URLs. The mobile computing device reads this data and generates a display showing all (or a subset of) the URLs from the web site (and/or associated graphical icons) as if they had all been obtained directly from the token generator.

In some embodiments, the data for a web site includes a software code or command that is sent from the Web server along with the web site data. The software code or command, when received by a mobile computing device including a wireless communication device (e.g., Wi-Fi), initiates a scan using the wireless communication device, such as to receive network names or receive only those network names that meet certain specifications (such as if the token protocol code meets certain criteria, such as including "WP*"). In some embodiments, the mobile computing device then accesses one or more additional web sites identified by the network name, provides a list of the web sites or domains, or retrieves content associated with a received token.

In some embodiments the graphical element includes a transaction symbol (e.g., a dollar sign, or a transaction amount) that indicates a "buy-it now" function. Upon selection of the graphical element, a transaction is approved. For example, when the user approaches a vending machine, the vending machine token generator sends a token that causes the mobile computing device to display the graphical element including the transaction symbol. The user can select the graphical element to approve the crediting of an appropriate amount to the vending machine, so that a purchase can be made from the vending machine.

FIG. 14 is a screen shot of an example user interface 362 displayed on computing device 310, illustrating an example domain registration process for registering a domain with a token server 342.

The user interface 362 is displayed on computing device 310. The user interface 362 can be a user interface of a software application running on computing device 310, or the display of a web page from a web server, such as from token server 342 or another web server associated with the token server 342.

In this example, the user interface 362 prompts the user to enter information to complete the registration process. The information can include, for example, a user name, a password, a first and last name, a home address, a business name, a business address, the domain 363 to be registered, a graphical element to be associated with the domain, a verification that the user registering is the owner of the web domain or an authorized representative of the owner, and payment information. After the information has been entered, a register button is selected 364.

Upon selection of the register button, the registration information is evaluated by the server 342. In some embodiments, the token server 342 confirms that the user and/or business is the owner of the domain, or is authorized by the domain owner. In some embodiments the domain owner is notified of the registration, along with instructions describing how to notify the token server operator if the registration has not been authorized by the domain owner.

The payment may be a flat fee to register a domain, or may be a recurring subscription fee. In addition, different levels of registration or subscription may be available. For example, some levels can be purchased to cause the system to automatically promote the domain in listings, such as using the priority code 406 described herein. Some levels will cause the system to include the domain in a featured listing section, for example. Some levels will increase the rank of a domain for a ranking algorithm.

Figure 16:
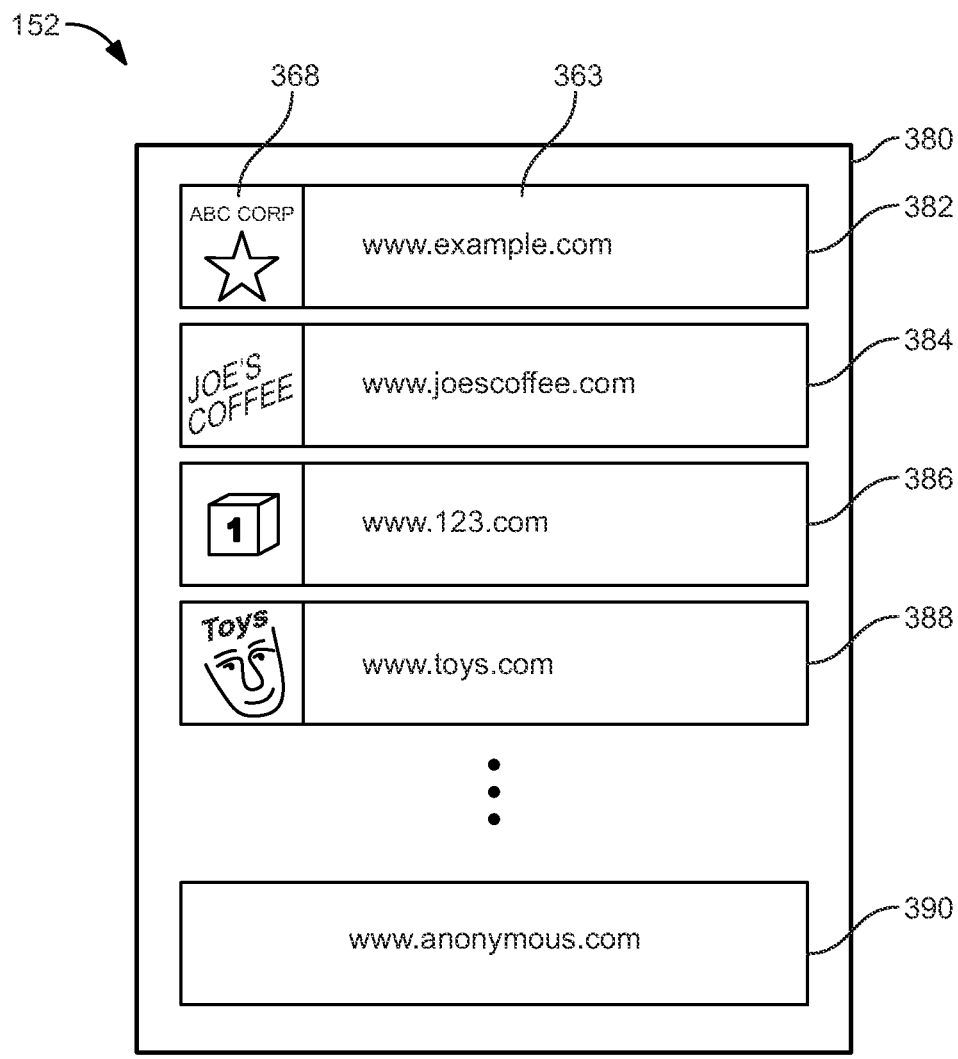
FIG. 16 is a screen shot of an example user interface display depicting information associated with tokens that have been collected.

In some embodiments, a graphical element is supplied which will be displayed as part of the token display, illustrated and described in FIG. 16. In another possible embodiment, generic icons may be available for selection. In this case, several domain codes can be associated with the same graphical element. Limitations can be placed on what domains can utilize certain generic graphical elements to avoid consumer confusion, if necessary.

Figure 15:
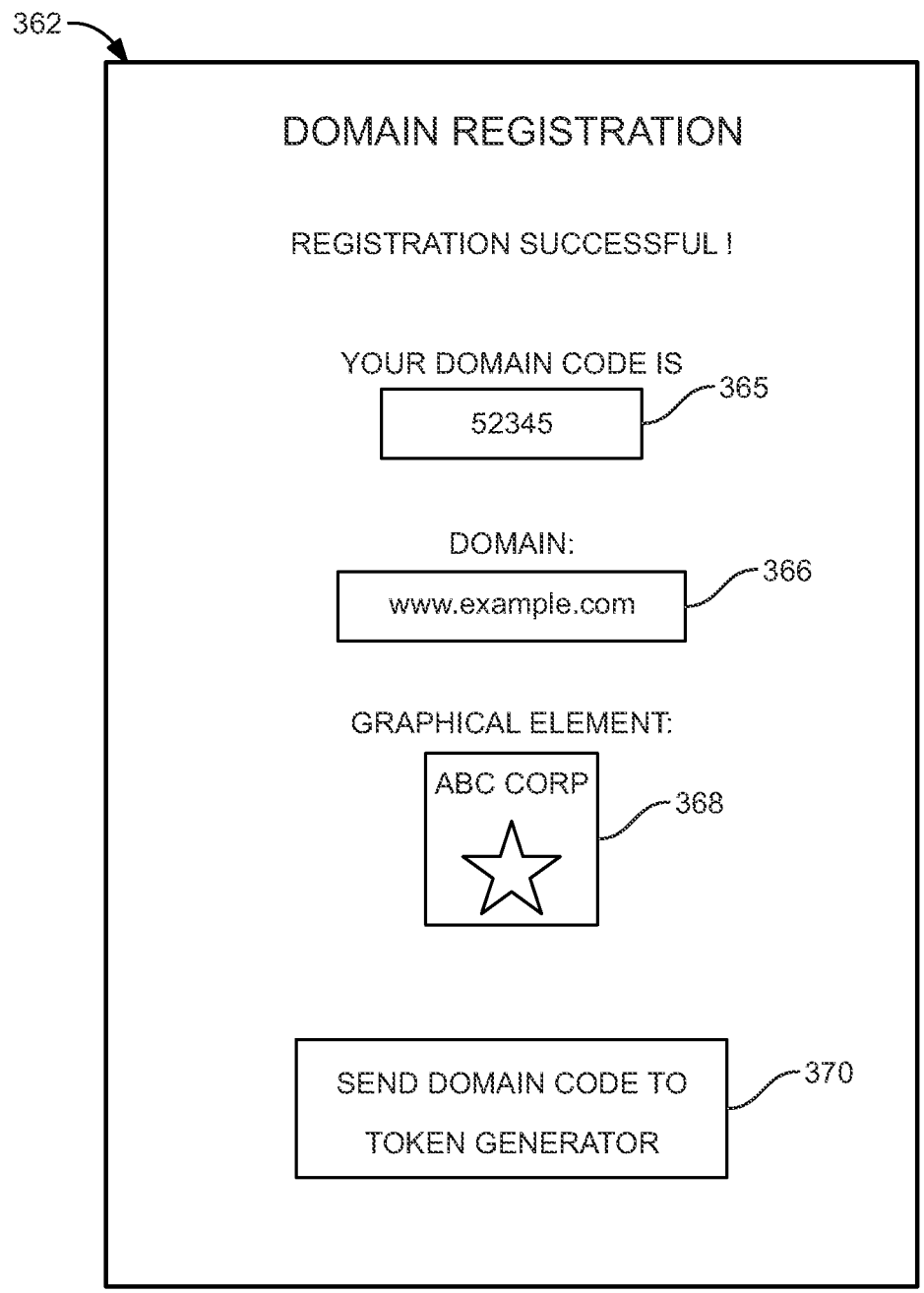
FIG. 15 is a screen shot of an example user interface illustrating the completion of the domain registration process shown in FIG. 14.

FIG. 15 is a screen shot of an example user interface 362 displayed on computing device 310, illustrating the completion of the domain registration process.

Upon successful completion of the domain registration process, the user interface 362 informs the user that the registration has been completed successfully. In some embodiments, the user interface 362 displays the domain code 365 that has been assigned to the domain 366, as well as the graphical element associated with the domain. The domain 366, domain code 365, and graphical element 368 are stored in the token server 342 database, and data associating the domain 366 and graphical element 368 with the domain code 346 is entered into lookup table 350 (FIG. 13), for example.

In some embodiments, upon successful completion of the registration process, the user interface 362 prompts the user to send the domain code 346 to the token generator 102. If the token generator 102 is in data communication with the computing device 310 (FIG. 13), selection of the send button 370 initiates the transfer of the domain code 346 to the token generator 102. The data communication can occur through a universal serial bus (USB) port, for example, or any other wired or wireless communication device(s). The data communication can also involve one or more data communication networks, in some embodiments. In other embodiments, the data must be communicated to the token generator by a direct wired connection, or manually, for added security.

FIG. 16 is a screen shot of an example user interface display of a mobile computing device 152, depicting information associated with tokens that have been collected.

After the mobile computing device 152 has collected one or more tokens from one or more token generators 102 (e.g., FIG. 13), information about the tokens is displayed in user interface 380. This example shows the information in a list format.

The user interface 380 includes a separate token display for each token. This example illustrates example token displays 382, 384, 386, 388, and 390. Each display is associated with one of the tokens 344 (e.g., FIG. 13) that have been received by the mobile computing device 152.

For example, display 382 displays information that was received from ABC Corp. The token display 382 includes the graphical element 368 and the domain 363. Other information can be displayed in other embodiments. For example, the information can include text, video, audio, animations, etc. In some embodiments, the domain is not displayed. Such information can be provided by the domain owner during the registration process, such as through the user interface 362 shown in FIG. 14.

Token displays 384, 386, 388 include similar information. Displays 382, 384, 386, and 388 are all examples of displays associated with domains that have been registered with token server 342.

In some embodiments, the user interface 380 can also include information about tokens that were received for domains that are not registered with token server 342, such as the token of wireless transmission 318 illustrated and described with reference to FIG. 12. In this case, the URL from the token is displayed without any additional information from the token server 342.

In some embodiments, token displays 382, 384, 386, 388, and 390 are selectable. In some embodiments token displays 382, 384, 386, 388, and 390 are selectable links, which are linked to the URL, and therefore also linked to the content available using the URL. Upon selection of one of the token displays, an action is performed. In some embodiments, the displays act as links. Upon selection of one of the displays, such as display 382, content is retrieved from web server 316 using the URL. The content is then displayed in user interface 380 or in a separate window, such as a browser window. An example of the content is a web page. Other examples of content include a file (e.g., document, movie, video, image, presentation), an app for the mobile computing device, music, or any other content that is downloadable in a digital format. Alternatively, the URL can cause the web server to take an action, which may or may not include sending content to the mobile computing device 152. For example, the URL can cause the web server to send content to another mobile computing device 152, another computing device, or otherwise take an action associated with a resource.

In another possible embodiment, upon selection of one of the displays, a menu is displayed that includes a variety of possible options. Some of the options include, for example, a save option, a like or dislike option, a share option, an option to retrieve the content using the URL, an automatic display option, or a variety of other possible options. Upon selection of the desired option, the associated action is completed by the mobile computing device.

An automatic display option can be selected to instruct the mobile computing device to automatically retrieve all content from the identified domain as tokens are received. In this way, as the mobile computing device is moved around a location the content can be automatically updated based on the mobile computing device's proximity to token generators. For example, if touring a museum, the mobile computing device can automatically access content relating to the nearest exhibit, without requiring the user to request the content for each exhibit. In some embodiments, content can be integrated with display timers so as to keep the user interface seamless (for example, if someone is halfway through a video, the video is allowed to continue playing until it reaches the end to avoid interrupting the video).

In some embodiments, the user interface is customizable. For example, the user can apply custom settings to the user interface to adjust the order in which token displays are listed, to filter token displays (e.g., so that some of the token displays are not shown), or to organize token displays (e.g., within certain categories), etc.

The order in which the token displays are arranged can be adjusted on the mobile computing device 152. In some embodiments, the token displays are arranged in reverse chronological order, such that the most recently received token is displayed at the top of the list. In another possible embodiment, a ranking algorithm at a server is used to determine the order of the token displays. The ranking algorithm can consider a variety of factors, such as an alphabetical order, a relevance score (e.g., how relevant the token is to a search query), an interest score (e.g., how relevant the token is to the user's interests), a time that the token was received, an elapsed time since the token was received, a priority code as described herein, whether the token is associated with a featured business, etc. In some embodiments, the token displays are only shown in the user interface 380 for a predetermined period of time after the token has been received. The period of time can be variable on one or more factors, such as the priority code or a relevance score. In some embodiments the token displays are securely archived for review at a later date or time.

In some embodiments, if multiple tokens are received for the same domain, the mobile computing device 152 can operate to display only one of the token displays to avoid having a large number of the same or similar token displays being included in the user interface 380. In some embodiments, the user interface 380 displays a message or an icon indicating that multiple tokens have been received, and prompting the user to provide an input if the user wants to see each of the individual token displays in the user interface 380. Upon receipt of the input, the individual token displays are shown in the user interface.

In some embodiments, user interface 380 includes a search interface for searching for tokens matching or related to a search query.

In some embodiments, token displays include a graphical feature to identify a characteristic of the token display. For example, if particular content has been authorized by the providing user as OK for others to syndicate, the token display can be represented with a graphical feature that highlights the boundary around the token display in a particular color (e.g., green). The token can then be shared with others upon selecting a syndicate (or "share") option from a menu on the mobile computing device 152.

In some embodiments the MAC address and/or timestamps are used to allow or disallow syndication.

In some embodiments, token displays are grouped. Tokens can be grouped according to a variety of factors, such as topic, tag, subject, etc. These factors can be included in the token or stored in the token server 342. As one example, one page of a user interface can display all tokens associated with a group "sporting goods." Another page can display all tokens associated with "people nearby." The user can select between the different groups. In some embodiments the order in which tokens are displayed is based on a ranking algorithm, which considers the group as at least one of the factors in generating a ranking score. In some embodiments the mobile computing device detects movement, such as shaking. Upon detection of the movement, the user interface adjusts the order of token displays or the group that is currently displayed, and displays the title of the new token display group (i.e., people nearby).

FIG. 17 is a block diagram illustrating an example token 344 generated by a token generator 102 according to a first token protocol. In this example, the token includes a total of 32 digits. Other embodiments include more or fewer digits. As described herein, in some embodiments the token 344 is wirelessly transmitted by a token generator 102. In some embodiments the token 344 is transmitted as a network name.

In this example, the token includes several token portions, including a token protocol code 402, a domain code 346, a verification code 404, a priority code 406, and a URL portion 324.

The token protocol code 402 identifies a protocol of the token 344. In this example, the protocol code "WP*H" identifies the first protocol, which can be used to indicate that the token 344 conforms to the protocol depicted in FIG. 17. In some embodiments, the mobile computing device 152 that receives the token 344 can identify the token 344 as a token by confirming that the token 344 includes the token protocol code 402, or at least one of a plurality of token protocol codes. If a network name, for example, does not include the token protocol code, the network name is ignored. In some embodiments the token protocol code 402 has four digits. Other embodiments have more or fewer digits.

The domain code 346 is the domain code provided by the token server 342 after successful completion of the registration process described in FIGS. 14-15, for example. In some embodiments, the domain code 346 changes occasionally or periodically. In some embodiments the domain code 346 has five digits. Other embodiments have more or fewer digits.

The verification code 404 can be used to verify token 344, as described herein. In some embodiments the verification code 404 has three digits. Other embodiments have more or fewer digits.

The priority code 406 can be used to indicate relative priority between multiple tokens 344. In some embodiments the priority code 406 has four digits. Other embodiments have more or fewer digits.

As one example, during the registration process the domain owner can be given the opportunity to pay for an increased priority code 406. The priority code 406 is used by the mobile computing device to adjust the order or display properties of information associated with the token 344, in some embodiments. For example, the priority code 406 can be used to improve the ranking of the token in a ranking algorithm, increase the size of the graphical element or token display (see, FIG. 16), increase the duration that a token display will remain in the user interface 380 (FIG. 16) after the token is received, or otherwise adjust the display properties of the token display (e.g., flashing, highlighting, background color, font type, font size, font style, animation, etc.).

The URL portion 324 includes at least a portion of a URL, or data that can be used to obtain a URL. Some embodiments include a path of the URL. If the length of the URL portion is too long to fit within the available quantity of digits, a URL mapping system or service can be used to provide a shortened URL, URL portion, or URL code that can be used to obtain the full URL, or URL portion, or otherwise access the content identified by the URL. Examples of URL mapping services include littleurl, tinyrul, is.gd, url.ie, easyurl, jmp2.net, w3t.org, xil.in, xaddr.com, doiop.com, snurl, and the like. In some embodiments a data compression and decompression algorithm is used. In some embodiments the URL portion includes sixteen digits. Other embodiments have more or fewer digits.

In some embodiments, a URL mapping server is provided, such as to link a short URL with a longer URL. The URL mapping server, in addition to allowing a token to include a shorter URL, can also be used to track usage of the system. In some embodiments, a fee is charged upon each use of the URL mapping server. For example, each time that a user is directed to a web site associated with a company, that company is charged a fee. As another example, the company may purchase a number of uses, and the URL mapping server will redirect to the company's web site until the number of uses has been exceeded. In some embodiments, the fees are determined through an auction process.

Other token protocols can be formed of one or more of these token portions and/or other token portions.

FIG. 18 is a block diagram illustrating another example token 344 generated by a token generator 102 (e.g., FIG. 12) according to a second token protocol. In some embodiments, the first token protocol shown in FIG. 17 is compatible with the second token protocol shown in FIG. 18.

In this example, the token 344 includes a token protocol code 402 and a URL portion 324. The token protocol code 402 and the URL portion 324 collectively form a complete URL in some embodiments.

In this example, the token protocol code 402 is "www." Like the token protocol code 402 shown in FIG. 17, the token protocol code 402 includes four digits, for example. A mobile computing device receiving either token 344 can use the token protocol code 402 to identify whether the data is a token at all, and if so, which protocol the token conforms to. In this case "www." identifies the token 344 as belonging to the second protocol. Other embodiments include more or fewer digits for the token protocol code 402, and may include more than two protocols.

The URL portion 324 contains the remainder of the URL, such that the combination of the token protocol code 402 and the URL portion 324 forms the complete URL. As discussed above, URL mapping can be used to provide a shortened URL if desired, or compression and decompression can similarly be used. Alternatively, a token having more digits is used. As another alternative, several tokens can be used to obtain different portions of the URL, which can then be combined into the full URL.

Figure 19:
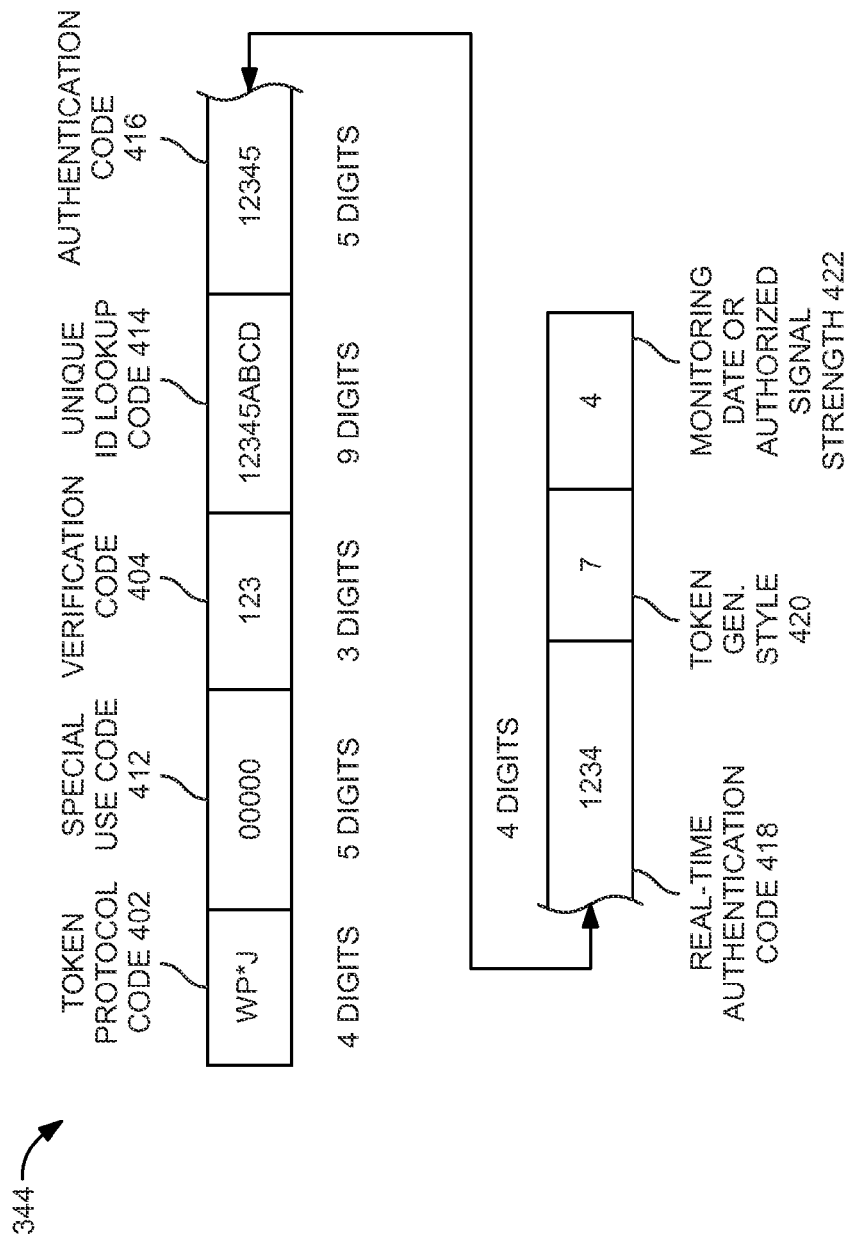
FIG. 19 is a block diagram illustrating another example token according to a third protocol.

FIG. 19 is a block diagram illustrating another example token 344 according to a third protocol. In this example, the token 344 includes token protocol code 402, special use code 412, verification code 404, unique ID lookup code 414, authentication code 416, real-time authentication code 418, token generator style code 420, and monitoring data or authorized signal strength code 422.

In some embodiments, the token protocol code 402, verification code 404, and authentication code 416 are defined in the token generator 102 at the time of manufacture. The other token portions are populated by the mobile computing device 152, for example.

The real-time authentication code 418 is a code generated by a server that is in data communication with the token generator 102, such as when the mobile computing device is also a data packet generator, as described in more detail with reference to FIG. 20. In this case, the server can supply a real-time authentication code 418 to the mobile computing device 152, which in turn broadcasts the real-time authentication code 418 as part of token 344. The real-time authentication code 418 is then received by devices within the broadcast range of the mobile computing device 152. For example, a nearby laptop computer. The laptop computer (or other computing device) transfers the real-time authentication code back to the server to verify that the laptop computer is within the broadcast range of the mobile computing device. In this way, the real-time authentication code can function as a one-time password (or public security token). For example, if the process is completed successfully, the user using the laptop is permitted to continue to use the laptop. If the process is not completed successfully, the laptop is disabled. A computing device can thereby be adjusted between different operating modes, as described in more detail herein.

Figure 20:
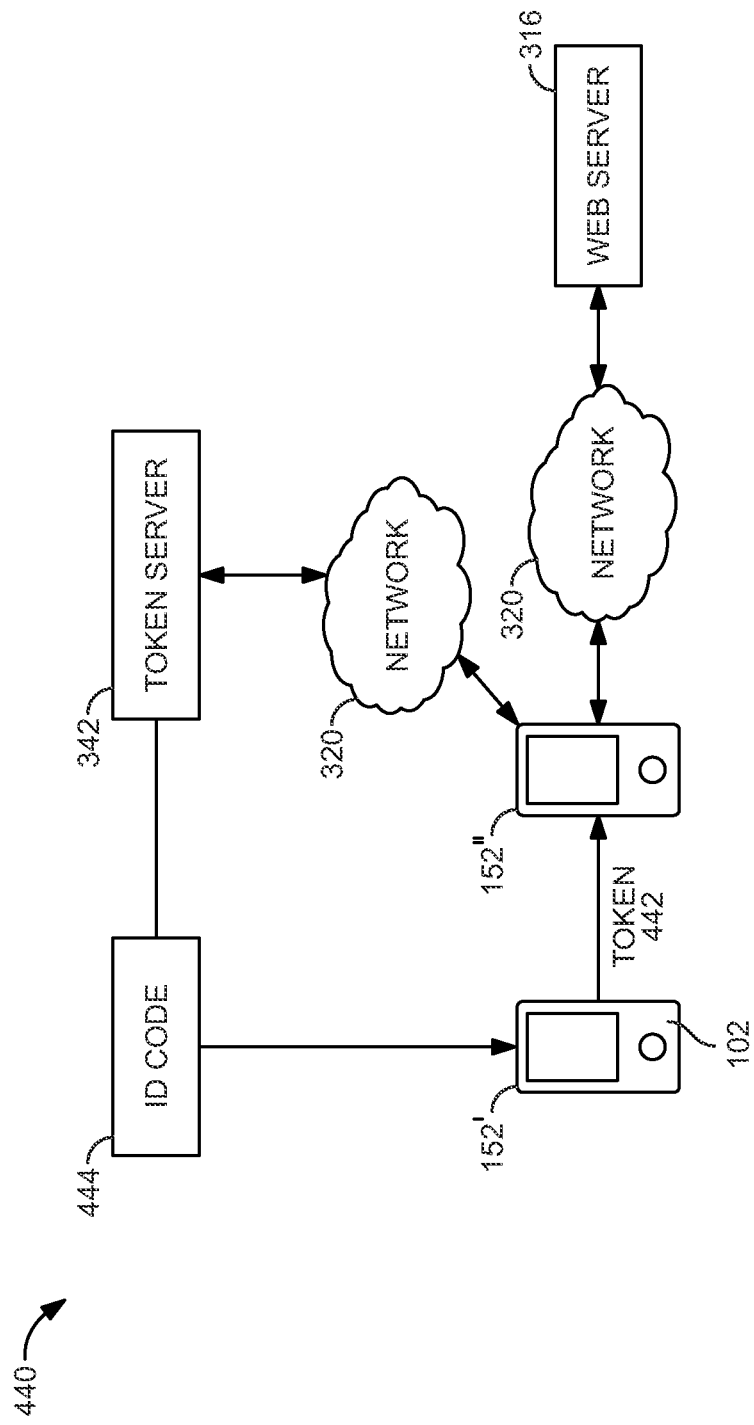
FIG. 20 is a schematic block diagram illustrating an example proximity-based information distribution system.

FIG. 20 is a schematic block diagram illustrating an example proximity-based information distribution system 440. In this example, the system 440 includes mobile computing devices 152' and 152". Some embodiments further include web server 316, and some embodiments include token server 342.

In this example, the mobile computing device 152' is also a token generator 102, and operates to generate a token 442 that is transmitted to another mobile computing device 152". Either of the mobile computing devices 152 can alternatively be another type of computing device. Examples of mobile computing devices 152 are smart phones, tablet PC's, and the like.

The system 440 can be used to perform the operations, methods, and functions described elsewhere herein. However, because the mobile computing device 152' is the token generator 102, the single mobile computing device 152' can perform the operations of both the computing device 310 and the token generator 102 (see, for example, FIGS. 12 and 13), and communication between those separate devices (e.g., via USB or other communication systems) is not required.

In some embodiments, the user of the mobile computing device 152' desires to communicate information to other mobile computing devices 152". To do so, the mobile computing device 152' can generate and send a token, such as by transmitting a token as described herein. For example, a token can be transmitted as a public transmission. In another example, the token is transmitted as a network name. In some embodiments, the network name or the public transmission include a URL, part of a URL, or data associated with a URL.

When mobile computing device 152" is within the broadcast range of mobile computing device 152', the mobile computing device 152" can receive the token 442. Upon receipt, the token can be stored, added to a list of token displays, or the content associated with the token can be retrieved from web server 316 using the URL. In some embodiments, tokens are encrypted prior to storage for security and user privacy.

Some embodiments include a token server. In this example, the user of the mobile computing device 152' can register with the token server through a similar process as illustrated in FIGS. 14-15, except that in some embodiments the user and mobile computing device may not be associated with any particular domain. Instead, the user is registered, and an identification code 444 is provided to uniquely identify the user. In this way, the identification code 444 can be used as part of the token. For example, the identification code 444 can be used as the unique ID lookup code 414 shown in FIG. 19.

In this example, the token 442 is received by the mobile computing device 152" and includes the ID code 444 and at least a portion of a URL. In some embodiments, before the mobile computing device 152" will use the token, the ID code 444 is forwarded to the token server 342 for verification. Upon verification, information about the token is displayed, or content is retrieved from a web server 316 identified by the URL.

In some embodiments, the proximity-based information distribution system 440 is at least part of a social networking system. The system permits people to interact with each other when they are in proximity to each other, for example.

As one example, a user can have his computing device 152 transmit a token including a URL to a web site that includes biographical information about himself. Examples of such web sites include a LinkedIn page, a myspace page, a relationship page (e.g., match.com or eHarmony page), and a personal home page. In this way, the token acts like a personal business card that can be viewed by people that are within the broadcast range of the mobile computing device 152'.

In another example, a user can promote information available at a web site by transmitting a token including a URL to the web site. The web site may be the site for his band, a web site with educational material, or any other content available on a web page.

The system shown in FIG. 20 can also integrate with other social networking systems, such as any one or more of the systems included in the Conversation Prism, available at www.conversationprism.com. In addition, social influence scores such as Klout scores can integrate with and be influenced by the system. In some embodiments, the system can integrate with or interact with the StumbleUpon system. In some embodiments, the system can interact with or integrate with the Gigwalk system. In some embodiments, the system can interact with or integrate with the Layar system.

In some embodiments, tokens received by a mobile computing device 152" can be used by the mobile computing device 152" (or another computing device) to provide context for various functions. For example, if the mobile computing device 152" receives tokens from five nearby mobile computing devices 152', and each token includes links to social networking pages for the users of the five nearby mobile computing devices 152', the data from the social networking pages could be compared to provide context for other functions. For example, if the data shows that many of the people have the same hobby listed, the context could be used to improve search rank results for web pages that have content associated with that hobby. As another example, the social networking page for the user of mobile computing device 152" could be modified to emphasize information that may be more likely to be of interest to those nearby. The human brain uses context information to help interpret events, and in this same way, context information received from tokens can be used by computing devices to improve functionality.

In some embodiments, a system such as shown in FIG. 20 can be used as a payment system. For example, a consumer using mobile computing device 152" can receive a token from a vendor mobile computing device 152' at a sporting event. The mobile computing device 152' can have a highly directional antenna, if desired, to direct the token to the mobile computing device 152". The token is received by the mobile computing device 152". The token can include a transaction amount within the special use code 412 (FIG. 19), for example. The mobile computing device 152" then prompts the user to confirm that the user wants to proceed with the transaction along with a display of the transaction amount. Upon confirmation, the token is sent to the token server 342 or another server for processing of the payment. A confirmation is sent to the vendor mobile computing device 152' (e.g. illuminating a light at the mobile computing device), and the vendor provides the product to the consumer. The system can similarly be used in other vending or purchasing scenarios (e.g., a pop machine, a point of sale terminal, a purchase through a television equipped with a token generator 102, etc.).

In some embodiments involving mobile computing devices 152, the transmission of and scanning for a token can be timed to occur at known time intervals. These time intervals may correspond to time intervals required by mobile computing device 152 operating systems, such as to conserve battery power. For example, one operating system may be configured to send and receive only in the first twenty seconds of each minute, based on clocks that are synchronized to a cellular network clock. If so, the sending of tokens can be timed to occur within the required time intervals.

Figure 21:
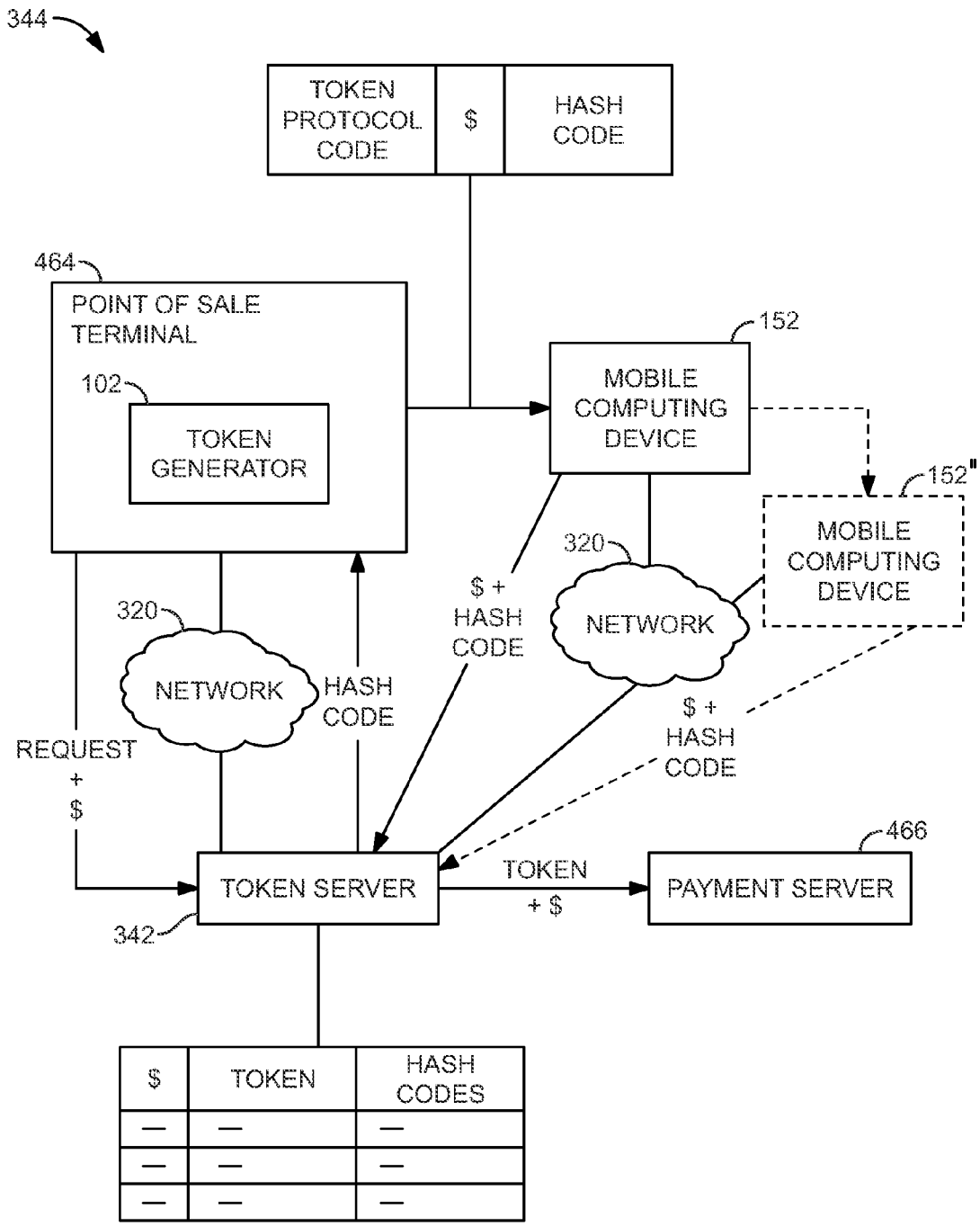
FIG. 21 is a schematic block diagram of an example payment system.

FIG. 21 is a schematic block diagram of an example payment system 460. In some embodiments, the payment system includes token server 342, point of sale terminal 464, mobile computing device 152, and payment server 466. At least some communication typically occurs across a data communication network 320, such as including the Internet. In this example, a consumer using mobile computing device 152 completes a purchase from a point of sale terminal using mobile computing device 152.

In some embodiments, a transaction is initiated by a point of sale terminal 464, which sends a request 470 to the token server 342 including the transaction amount. The token server 342 includes, in some embodiments, a database including tokens and hash codes associated with the tokens. In addition, the transaction amount is stored in the database and associated with the token and hash code to which it relates. In another embodiment, the token server 342 generates a token according to a token generation algorithm, and then uses another algorithm to generate a hash code for the token. The hash code is then sent back to the point of sale terminal 464. Alternatively, the token itself is sent to the point of sale terminal in some embodiments.

The point of sale terminal 464, which is or includes a computing device, also includes a token generator 102. The point of sale terminal 464 is, for example, a cash register in a retail store, a mobile computing device of a service provider (e.g., a plumber or a street vendor), a vending machine, or a variety of other possible devices. The token generator 102 generates and wirelessly sends a token 344 to the mobile computing device 152 of the consumer that is nearby the point of sale terminal. In this example, the token 344 includes a token protocol code, the transaction amount, and the hash code from the token server 342.

In some embodiments, the token includes additional or different data. For example, in some embodiments the token includes a URL, portion of a URL, data associated with a URL, or data that can be used to obtain a URL. The mobile computing device 152 uses the URL to retrieve additional data, such as the transaction amount and the hash code, or to access a user interface where the transaction can be completed through the network 320, such as through a web interface of the payment server 466.

In another embodiment, as illustrated in FIG. 21, the mobile computing device 152 prompts the user to approve the transaction, and upon approval, sends an approval message to token server 342. In this example, the approval message includes the transaction amount and the hash code. The token server compares the hash code and the transaction amount to the data in the database and confirms that they are the same as stored in the database.

Time stamps can also be used as another confirmation. For example, by comparing the time at which the token server 342 sent the hash code, to a time stamp indicating the time at which the token was received by the mobile computing device 152, a confirmation can be made that they are within a predetermined period of time apart. In another example, the token server requires that the hash code be returned within a timeout period (e.g., 30 seconds, 2 minutes, 5 minutes, etc.) in order for the transaction to be completed.

Once the transaction amount and hash code have been confirmed by the token server, the token server retrieves the full token from the database, and sends the token and the transaction amount to the payment server 466. The payment server 466 evaluates the token to confirm that the token is valid, and then completes an electronic payment transaction to cause the payment to be made from the consumer's account associated with the mobile computing device 152 to the person or business associated with the point of sale terminal 464. In some embodiments, the token is compliant with standards of the payment card industry (PCI).

Some embodiments involve syndication of the token 344 to another mobile computing device 152". In this example, after the mobile computing device 152 has received the token 344, the user can be prompted to identify another person to whom the token 344 should be transferred. In this example, the user identifies the owner of mobile computing device 152", which may be nearby or remote from mobile computing device 152. The token 344 is then transferred by any suitable communication, such as across network 320 (such as in an e-mail, or through a third party server—such as a social networking server, etc.), in a text message, or by wirelessly transmitting the token 344 using radio frequency signals, such as in a network name, or through other near-field communication, etc. Such syndication of tokens can also be used other tokens described herein.

The user of mobile computing device 152" is then prompted to approve the transaction, and upon approval, the transaction amount and hash code are sent to token server 342, and payment is completed by the payment server 466.

Figure 22:
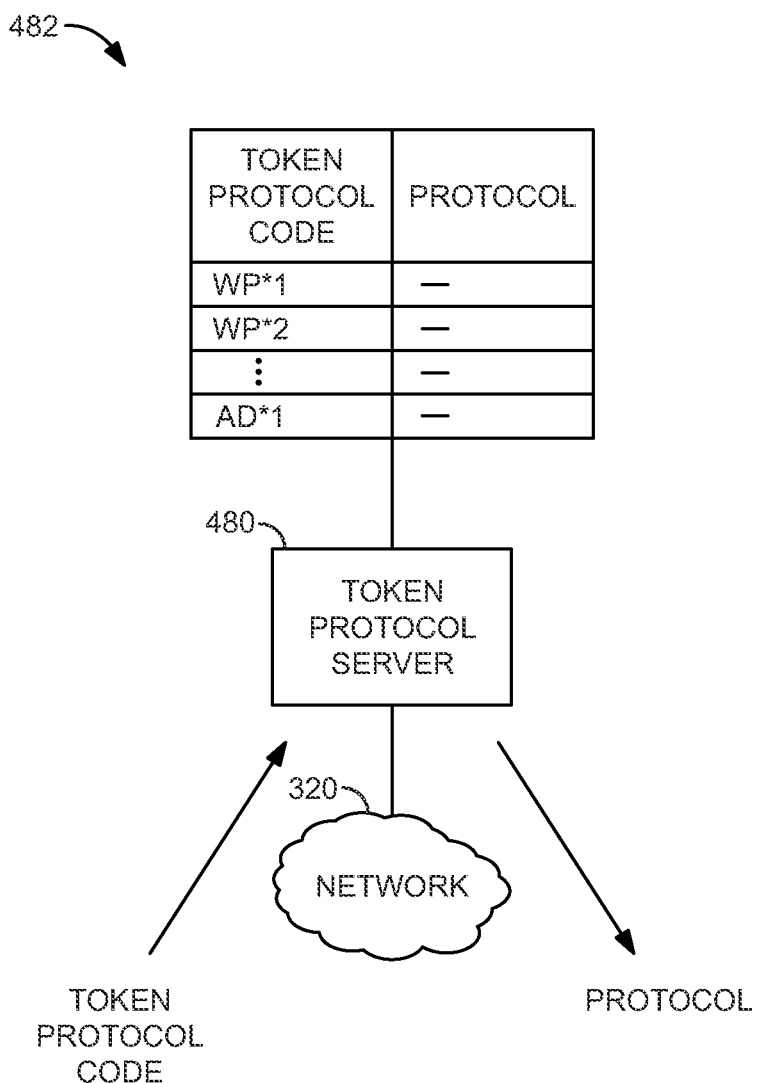
FIG. 22 is a schematic block diagram illustrating the operation of an example token protocol server.

FIGS. 22-23 illustrate examples of a token protocol registration process and system.

FIG. 22 is a schematic block diagram illustrating the operation of an example token protocol server 480. Tokens, as described herein, can be generated according to a variety of different data protocols. Several examples of token protocols are described herein, such as illustrated in FIGS. 17-19. In addition to these protocols, a wide variety of alternative protocols could also be used. A token protocol server 480 is provided in some embodiments to manage these protocols.

For example, the token protocol server includes a database 482 that links token protocol codes with the associated protocols. In this way, a token protocol code can be provided to the token protocol server 480, for example, which uses the token protocol code to retrieve data defining the protocol associated with the token protocol code. The data defining the protocol is then sent to the requesting computing device.

In another possible embodiment, an entire token is provided to the token protocol server, and the token protocol server interprets the token according to the appropriate protocol, by retrieving the token protocol code from the token, and then identifying the associated protocol from the database 482. In some embodiments, the token protocol server 480 is the same as the token server 342 described herein.

FIG. 23 is a screen shot of an example user interface 490 of a token protocol registration process. In some embodiments, the user interface 490 is provided by the token protocol server 480 (FIG. 22), or by a separate token protocol registration server that is in data communication with the token protocol database 482.

The user interface 490 prompts the user to define the new protocol, such as by giving the protocol a name, identifying the total number of digits that can be included in the protocol, and identifying the types of data that are intended to be included in the token. For example, digits 1 to 4 are designated for the token protocol code. In some embodiments the token protocol code digits are required to be included in the protocol, and cannot be modified by the user, so that the protocol of a given token can be identified upon receipt of the token. Digits 5 to 10 are designated for the domain code. Digits 11 to 32 are designated for a vehicle identification number. The protocol can define more or fewer token segments, as desired. A registration button is provided to complete the protocol definition process.

In some embodiments, the user is required to pay to register the new protocol. The payment may be a one-time payment or a periodic subscription fee.

A token protocol code is then assigned to the protocol, or selected by the user. The protocol code is unique, in some embodiments, so that no two protocols share the same protocol code. In this example, the new protocol is assigned the protocol code "AD*1."

Upon completion of the registration, the new token protocol code and associated protocol are stored in the token protocol database 482 (FIG. 22).

Some of the systems and methods described herein can also be used to enhance interactive gaming. For example, teams are granted advanced features (extra lives, strength, virtual currency, etc.) when the mobile computing devices being used are verifiably near to one another, or near a special token generator having a code to unlock special features.

In some embodiments, some of the systems described herein are used to access resources. Some embodiments include purchase orders. A purchase order can be placed and tokens generated by the mobile computing device 152 can tell vendors about the purchase order that has been placed. If a vendor wants to fulfill the order, the vendor can locate the user and complete the transaction. In some embodiments a photograph of the user is accessible so that the vendor can identify the user.

Some embodiments include work orders, which define a service that is needed and the terms upon which payment will be made. For example, a token can be broadcast that is associated with a work order to mow a lawn. If a service provider receives the token, and is willing to complete the work, the work order can be accepted, the service provided, and the transaction completed. In some embodiments, the user placing the work order must approve completion of the work order before the transaction is completed.

Some embodiments influence Internet search results based on tokens that are received. The tokens indicate proximity, and can be used to influence search results provided by an Internet search engine.

Some embodiments utilize audio triangulation.

The various operations, methods, and functions described herein as being performed by a computing device (including mobile computing devices and servers) can alternatively be performed by multiple computing devices. In addition, any of the operations described as being performed by a particular computing device can alternatively be performed by another computing device. For example, operations can be performed on the mobile computing device 152 using a software application running on the mobile computing device 152, or alternatively can be performed at a server which is in data communication with the mobile computing device 152. A more specific example is the generation of the user interface 380 shown in FIG. 16 and associated sorting, filtering, and/or ranking algorithms. The various embodiments can perform operations on a computing device or utilize cloud computing, for example.

In an example embodiment, a token generator 102 is integrated with a restaurant paging system that operates to alert customers when a table is ready. Other examples are described herein.

Some embodiments are or include one or more of the following:

A system comprising a token generator operable to wirelessly transmit security tokens periodically; and a mobile computing device operable to receive the security tokens from the token generator, wherein the mobile computing device operates in a first mode when the security tokens are periodically received, and in a second mode when the security tokens are not periodically received.

A method of operating a mobile computing device, the method comprising: monitoring for and receiving a security token if available; operating the mobile computing device in a first mode if the security token is received; and operating the mobile computing device in a second mode if the security token is not received.

A method wherein when the mobile computing device is in the first mode, the mobile computing device broadcasts the passcode for use in two factor authentication for a second computing device.

A method of accessing a resource, the method comprising: receiving a token with a wireless communication device of a computing device; requesting information with the computing device through a network at a URL using the token as part of the URL; and receiving data to the wireless communication device in response to the request.

A method of providing content across a network, the method comprising: receiving a request for information through a network at a server computing device, the request including a URL including a token generated by a token generator; and sending data from the server computing device, the data being associated with the token.

A remote control device comprising: a housing; at least one input device; and electronic circuitry comprising at least a processing device, and a wireless communication device, wherein the electronic circuitry generates and wirelessly transmits a token upon receipt of an input from the input device.

A remote control wherein the token is broadcast as a network name.

A remote control wherein the token is broadcast as a service set identifier according to an IEEE 802.11 wireless communication standard.

A method of operating a mobile computing device, the method comprising: displaying a first content item of a presentation; receiving a token from a remote control, the token including a code; and displaying a second content item of the presentation after receiving the token from the remote control.

A method wherein receiving the token comprises receiving a wireless radio frequency signal.

A method wherein the token is a network name.

A method wherein the first content item and the second content item are web pages.

A method further comprising retrieving the second content item with a URL including the code, prior to displaying the second content item.

A social networking system, comprising: a token generator associated with a first person, and operable to wirelessly transmit a token; a mobile computing device associated with a second person, and operable to receive the wirelessly transmitted token when the mobile computing device is within a transmission range of the token generator, and to transmit at least a portion of the token across a network; and a server coupled to the network to receive the token and search for a relationship between the first person and the second person in a social networking database, and to send data to the mobile computing device to alert the second person to the relationship.

A token generator including at least a processing device and a wireless communication device, wherein the token generator transmits at least a portion of a URL as a network name using the wireless radio frequency communication device.

A method of promoting web content, the method comprising transmitting with a wireless network device at least a portion of a URL as a network name.

A method of accessing web content, the method comprising: wirelessly receiving at least a portion of a URL with a computing device; using the at least a portion of the URL to retrieve content from a server computing device.

A method of accessing web content, the method comprising: wirelessly receiving data associated with a URL with a computing device; generating and displaying a graphical element on the computing device; and retrieving content using the URL upon selection of the graphical element.

A method of accessing web content, the method comprising: wirelessly receiving data associated with a URL with a computing device; sending a portion of the data to a server; receiving an identification of a domain from the server; and retrieving content using the URL, the URL including the domain.

A method of operating a token server, the method comprising: receiving at least a portion of a network name from a mobile computing device, the network name originating from a token generator; identifying a domain associated with at least the portion of the network name; and sending the domain to a mobile computing device.

A method of operating a mobile computing device, the method comprising: receiving a wirelessly transmitted token with a wireless communication device, the token including data; wirelessly sending at least a portion of the data to a server through a data communication network using a cellular communication device; receiving at least a portion of a uniform resource locator from the server through the data communication network; and retrieving data from a Web server using the at least a portion of the uniform resource locator.

A method further comprising displaying on a display device of the mobile computing device a graphical element, and wherein retrieving data occurs after receiving an input from a user selecting the graphical element.

A mobile computing device comprising: a processor device; a display configured to generate a user interface and operably connected to the processor device; an input device configured to receive input from a user and operably connected to the processor device; a wireless communication device operably connected to the processor device and configured to wirelessly receive a token transmitted with a radio frequency signal according to a data communication protocol, the token including at least part of a uniform resource locator; and a cellular communication device configured to wirelessly request data through a data communication network using the at least part of a uniform resource locator.

A mobile computing device comprising: a processor device; a display configured to generate a user interface and operably connected to the processor device; an input device configured to receive input from a user and operably connected to the processor device; a cellular communication device configured to wirelessly communicate with a data communication network and operably connected to the processor device; a wireless communication device operably connected to the processor device and configured to wirelessly transmit a token using a radio frequency signal according to a data communication protocol, wherein the token includes at least part of a uniform resource locator.

A mobile computing device comprising: a processor device; a display configured to generate a user interface and operably connected to the processor device; an input device configured to receive input from a user and operably connected to the processor device; a cellular communication device configured to wirelessly communicate with a data communication network and operably connected to the processor device; a wireless communication device configured to wirelessly transmit a token using radio frequency signals according to a data communication protocol, wherein the token includes at least part of a uniform resource locator.

A token generator comprising: a processor device; and a wireless communication device operably connected to the processor device, wherein the wireless communication device is configured to wirelessly transmit data using radio frequency signals according to a data communication protocol, wherein the wireless communication device transmits a token including data as a network name according to the data communication protocol, and wherein the data is one of: a uniform resource locator, a portion of a uniform resource locator, and usable to obtain a uniform resource locator.

A token generator comprising: a processor device; and a wireless communication device, wherein the token generator wirelessly transmits at least a part of a uniform resource locator as a network name.

A token generator wherein the network name is transmitted according to an IEEE 802.11 wireless communication protocol.

A token generator wherein the token generator is one of a remote control, a wireless network device, and a mobile computing device.

A token generator wherein the token generator is a smartphone.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A token generator, wherein the token generator is a mobile computing device, the token generator comprising:
a processor device;
a wireless communication device operably connected to the processor device and configured to wirelessly transmit a token using radio frequency signals according to a radio frequency data communication protocol, wherein the token is transmitted by the wireless communication device as a network name according to the data communication protocol, and the token includes at least a portion of a uniform resource locator;
a touch sensitive display configured to generate a user interface, operably connected to the processor device, and operable to receive input from a user; and
a cellular communication device configured to wirelessly communicate with a cellular data communication network and operably connected to the processor device.

2. The token generator according to claim 1, wherein the radio frequency data communication protocol is a Wi-Fi protocol according to one of the IEEE 802.11 family of protocols, and wherein the network name is a Wi-Fi network name.

3. The token generator of claim 1, wherein the token generator is one of: a remote control, a non-mobile computing device, a mobile computing device, a keychain, and a wireless network device.

4. A method of operating a token generator, wherein the token generator is a mobile computing device, the method comprising:
wirelessly transmitting a token with the token generator, the token generator including at least a processing device and a wireless communication device, wherein the token is transmitted with radio frequency signals according to a radio frequency data communication protocol as a network name, the token including at least a portion of a uniform resource locator;
receiving an input into a touch sensitive display of the mobile computing device; and
wirelessly transmitting the token after receipt of the input to a second mobile computing device that is within a wireless transmission range of the mobile computing device.

5. The method of claim 4, wherein the input provides a transaction amount, and wherein the token includes the transaction amount to request approval of a transaction from the second mobile computing device.

6. The method of claim 5, further comprising:
sending a request to a token server including the transaction amount;
receiving a hash code from the token server in response to the request; and
including the hash code in the token when wirelessly transmitting the token.

7. A mobile computing device comprising:
a processor device;
a wireless communication device operably connected to the processor device to wirelessly receive a token encoded in a radio frequency signal, the token including at least part of a uniform resource locator;
a cellular communication device operably connected to the processor device to wirelessly request data through a data communication network using the at least part of the uniform resource locator; and
a touch sensitive display device operably connected to the processor device, configured to display a user interface, and configured to receive input from a user, wherein the user interface displays a graphical icon upon receipt of the token, the graphical icon being selectable by the user to cause the mobile computing device to retrieve additional content using the at least part of the uniform resource locator.

8. The mobile computing device of claim 7, wherein the mobile computing device is a smartphone.

9. A method of operating a mobile computing device, the method comprising:
wirelessly receiving a token from a radio frequency signal using a wireless communication device, the token including at least a part of a uniform resource locator and a transaction amount, wherein receiving the token comprises receiving the token from a network name from the radio frequency signal according to a wireless radio frequency data communication protocol;
sending a request to a web server with a cellular communication device using at least the part of the uniform resource locator; and
displaying the transaction amount to the user with a display device and prompting the user to approve a transaction.

10. The method of claim 9, wherein prompting the user to approve a transaction comprises displaying a graphical element, and further comprising receiving approval of the transaction by receiving an input selecting the graphical element.

11. The method of claim 9, further comprising receiving multiple tokens including multiple different URLs, and a selectable graphical element for each of the multiple tokens.

12. The method of claim 9, wherein sending the request to the web server causes the web server to generate a work order.

13. The mobile computing device of claim 7, wherein the token is a security token, and wherein the mobile computing device is configured to operate in a first mode when the security token is received and in a second mode when the security token is not received.

14. The method of claim 9, wherein the token is a security token, and further comprising operating the mobile computing device in a first mode when the security token is received, and in a second mode when the security token is not received.

15. A token generator comprising:
a processor device;
a wireless communication device operably connected to the processor device and configured to wirelessly transmit a token using radio frequency signals according to a radio frequency data communication protocol, wherein the token is transmitted by the wireless communication device as a network name according to the data communication protocol, and the token includes at least a portion of a uniform resource locator and a transaction amount.

16. The token generator according to claim 15, wherein the radio frequency data communication protocol is a Wi-Fi protocol according to one of the IEEE 802.11 family of protocols, and wherein the network name is a Wi-Fi network name.

17. The token generator of claim 15, wherein the token generator is a mobile computing device further comprising:
a touch sensitive display configured to generate a user interface, operably connected to the processor device, and operable to receive input from a user; and
a cellular communication device configured to wirelessly communicate with a cellular data communication network and operably connected to the processor device.

18. The token generator of claim 15, wherein the token generator is one of: a remote control, a non-mobile computing device, a mobile computing device, a keychain, and a wireless network device.

19. A method of operating a token generator, the method comprising:
wirelessly transmitting a token with the token generator, the token generator including at least a processing device and a wireless communication device, wherein the token is transmitted with radio frequency signals according to a radio frequency data communication protocol as a network name, the token including at least a portion of a uniform resource locator,
wherein the token generator is a wireless network device providing a wireless hotspot for accessing a data communication network, the method further comprising alternating between transmission of the token and transmission of a descriptive name of the wireless hotspot.

20. The method of claim 19, wherein the token generator is also a mobile computing device, and further comprising:
receiving an input into a touch sensitive display of the mobile computing device;
wirelessly transmitting the token after receipt of the input to a second mobile computing device that is within a wireless transmission range of the mobile computing device.

21. The method of claim 20, wherein the input provides a transaction amount, and wherein the token includes the transaction amount to request approval of a transaction from the second mobile computing device.

22. The method of claim 21, further comprising:
sending a request to a token server including the transaction amount;
receiving a hash code from the token server in response to the request; and
including the hash code in the token when wirelessly transmitting the token.

23. A method of operating a mobile computing device, the method comprising:
wirelessly receiving a token from a radio frequency signal using a wireless communication device, the token including at least a part of a uniform resource locator;
sending a request to a web server with a cellular communication device using at least the part of the uniform resource locator;
displaying a selectable graphical icon on the mobile computing device, the graphical icon including a company logo;
receiving an input selecting the graphical element; and
sending the request for data upon receipt of the input.

24. The method of claim 23, wherein receiving the token comprises receiving the token from a network name from the radio frequency signal according to a wireless radio frequency data communication protocol.

25. The method of claim 24, wherein the token includes a transaction amount, and further comprising displaying the transaction amount to the user with a display device and prompting the user to approve a transaction.

26. The method of claim 23, wherein prompting the user to approve a transaction comprises displaying a graphical element, and further comprising receiving approval of the transaction by receiving an input selecting the graphical element.

27. The method of claim 23, further comprising receiving multiple tokens including multiple different URLs, and a selectable graphical element for each of the multiple tokens.

28. The method of claim 23, wherein sending the request to the web server causes the web server to generate a work order.

* * * * *